(12) United States Patent
Hoang et al.

(10) Patent No.: US 12,250,574 B2
(45) Date of Patent: Mar. 11, 2025

(54) NR V2X—METHODS FOR CONGESTION CONTROL

(71) Applicant: INTERDIGITAL PATENT HOLDINGS, INC., Wilmington, DE (US)

(72) Inventors: Tuong Duc Hoang, Montreal (CA); Tao Deng, Roslyn, NY (US); Martino M. Freda, Laval (CA); Aata El Hamss, Laval (CA); Benoit Pelletier, Roxboro (CA); Chunxuan Ye, San Diego, CA (US)

(73) Assignee: InterDigital Patent Holdings, Inc.

( * ) Notice: Subject to any disclaimer, the term of this patent is extended or adjusted under 35 U.S.C. 154(b) by 0 days.

(21) Appl. No.: 17/265,865

(22) PCT Filed: Aug. 7, 2019

(86) PCT No.: PCT/US2019/045407
§ 371 (c)(1),
(2) Date: Feb. 4, 2021

(87) PCT Pub. No.: WO2020/033477
PCT Pub. Date: Feb. 13, 2020

(65) Prior Publication Data
US 2021/0314796 A1    Oct. 7, 2021

Related U.S. Application Data

(60) Provisional application No. 62/840,933, filed on Apr. 30, 2019, provisional application No. 62/804,487, (Continued)

(51) Int. Cl.
H04W 24/08    (2009.01)
H04W 28/02    (2009.01)
(Continued)

(52) U.S. Cl.
CPC ....... *H04W 24/08* (2013.01); *H04W 28/0289* (2013.01); *H04W 52/36* (2013.01); *H04W 4/40* (2018.02)

(58) Field of Classification Search
CPC ... H04W 24/08; H04W 28/0289; H04W 4/40; H04W 72/02
See application file for complete search history.

(56) References Cited

U.S. PATENT DOCUMENTS 10,856,176 B2    12/2020    Lee et al.
11,197,269 B2    12/2021    Zhang et al.
(Continued)

FOREIGN PATENT DOCUMENTS

| CN | 108024230 A | 5/2018 |
|---|---|---|
| CN | 108024287 A | 5/2018 |
| WO | 2018129017 A2 | 7/2018 |

OTHER PUBLICATIONS

CATT, "Correction to V2X in 36.300," 3GPP TSG-RAN2 Meeting #97bis, R2-1703076, Spokane, USA (Apr. 3-7, 2017).
(Continued)

*Primary Examiner* — Meng Vang
*Assistant Examiner* — Hector Reyes
(74) *Attorney, Agent, or Firm* — Volpe Koenig

(57) ABSTRACT

Methods, devices, and systems for congestion control in a wireless communications system. Some embodiments including receiving a plurality of zone configurations, receiving, for each of the plurality of zone configurations, a channel busy ration (CBR) threshold and a mapping of zone identities (IDs) to resource pools; and measuring a CBR of a resource pool with which the WTRU is currently configured. If the measured CBR meets a CBR threshold of a first zone configuration of the plurality, the WTRU is configured with the first zone configuration, with a zone ID based on the
(Continued)

first zone configuration and apposition of the WTRU, and with a resource pool base on the mapping and configured zone ID.

14 Claims, 12 Drawing Sheets

Related U.S. Application Data filed on Feb. 12, 2019, provisional application No. 62/789,802, filed on Jan. 8, 2019, provisional application No. 62/715,575, filed on Aug. 7, 2018.

(51) Int. Cl.
*H04W 52/36* (2009.01)
*H04W 4/40* (2018.01)

(56) References Cited

U.S. PATENT DOCUMENTS

| | | | |
|---|---|---|---|
| 11,317,319 | B2 | 4/2022 | Li et al. |
| 2017/0289986 | A1* | 10/2017 | Jin ................. G01S 5/0063 |
| 2018/0048572 | A1* | 2/2018 | Gulati ............ H04L 47/12 |
| 2018/0049129 | A1* | 2/2018 | Li .................. H04W 52/0235 |
| 2018/0124771 | A1* | 5/2018 | Mok ............... H04W 36/0072 |
| 2018/0234889 | A1* | 8/2018 | Baghel ........... H04W 24/08 |
| 2018/0234973 | A1* | 8/2018 | Lee ................ H04W 24/08 |
| 2019/0007812 | A1* | 1/2019 | Shilov ............ H04W 4/50 |
| 2019/0088125 | A1* | 3/2019 | Park ............... G07C 5/008 |
| 2019/0200366 | A1* | 6/2019 | Park ............... H04W 72/542 |
| 2019/0261216 | A1* | 8/2019 | Lee ................ H04W 72/0406 |
| 2019/0357025 | A1* | 11/2019 | Hwang ........... H04W 8/24 |
| 2020/0045674 | A1* | 2/2020 | Tseng ............. H04W 72/048 |
| 2020/0288432 | A1* | 9/2020 | Min ................ H04W 74/0808 |
| 2021/0021357 | A1* | 1/2021 | Curinga .......... H04H 60/42 |
| 2021/0051630 | A1* | 2/2021 | Chae .............. H04W 72/0453 |
| 2021/0176720 | A1* | 6/2021 | Chae .............. H04W 56/00 |
| 2021/0329678 | A1* | 10/2021 | Balasubramanian ............ H04W 72/1289 |

OTHER PUBLICATIONS

Huawei, "Introduce V2X in TS 36.331," 3GPP TSG-RAN WG2 Meeting #97, R2-1702420, Athens, Greece (Feb. 13-17, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital Inc., "Considerations for Geographical Zone Design for NR V2X," 3GPP TSG-RAN WG2 Meeting #105bis, R2-1904215, R2-1904215 (Apr. 8-12, 2019).

Interdigital Inc., "Text Proposal to 38.885 on Resource Pool Aspects for NR V2X," 3GPP RAN WG2 Meeting #105, R2-1901576, Athens, Greece (Feb. 25-Mar. 1, 2019).

Samsung, "ENB-assisted Congestion Control," 3GPP TSG-RAN WG2 Meeting #97, R2-1701281, Athens, Greece (Feb. 13-17, 2017).

Third Generation Partnership Project, "Technical Specification Group Radio Access Network; Evolved Universal Terrestrial Radio Access (E-UTRA); Multiplexing and channel coding (Release 15)," 3GPP TS 36.212 V15.1.0 (Mar. 2018).

Third Generation Partnership Project, "Technical Specification Group Radio Access Network; Evolved Universal Terrestrial Radio Access (E-UTRA); Multiplexing and channel coding (Release 15)," 3GPP TS 36.212 V15.2.1 (Jul. 2018).

Third Generation Partnership Project, "Technical Specification Group Radio Access Network; Evolved Universal Terrestrial Radio Access (E-UTRA); Multiplexing and channel coding (Release 15)," 3GPP TS 36.212 V15.6.0 (Jun. 2019).

Third Generation Partnership Project, "Technical Specification Group Services and System Aspects; Enhancement of 3GPP support for V2X scenarios; Stage 1 (Release 15)," 3GPP TS 22.186 V15.2.0 (Sep. 2017).

Third Generation Partnership Project, "Technical Specification Group Services and System Aspects; Enhancement of 3GPP support for V2X scenarios; Stage 1 (Release 15)," 3GPP TS 22.186 V15.3.0 (Jun. 2018).

Third Generation Partnership Project, "Technical Specification Group Services and System Aspects; Enhancement of 3GPP support for V2X scenarios; Stage 1 (Release 16)," 3GPP TS 22.186 V16.2.0 (Jun. 2019).

Third Generation Partnership Project, "Technical Specification Group Services and System Aspects; Study on enhancement of 3GPP Support for 5G V2X Services (Release 15)," 3GPP TR 22.886 V15.1.0 (Mar. 2017).

Third Generation Partnership Project, "Technical Specification Group Services and System Aspects; Study on enhancement of 3GPP Support for 5G V2X Services (Release 16)," 3GPP TR 22.886 V16.0.0 (Jun. 2018).

Third Generation Partnership Project, "Technical Specification Group Services and System Aspects; Study on enhancement of 3GPP Support for 5G V2X Services (Release 16)," 3GPP TR 22.886 V16.2.0 (Dec. 2018).

Vodafone, "New SID: Study on NR V2X," 3GPP TSG RAN Meeting #80, RP-181429, La Jolla, USA (Jun. 11-14, 2018).

Yang, "Study on Optimization Method of Same frequency Electronic Interference Cancellation in Multi Vehicle Communication System," Fire Control & Command Control, vol. 41, No. 12 (Dec. 15, 2016).

* cited by examiner

NR V2X—METHODS FOR CONGESTION CONTROL

CROSS REFERENCE TO RELATED APPLICATIONS

This application is the U.S. National Stage, under 35 U.S.C. § 371, of International Application No. PCT/US2019/045407 filed Aug. 7, 2019, which claims the benefit of U.S. Provisional Application No. 62/715,575 filed on Aug. 7, 2018, U.S. Provisional Application No. 62/789,802 filed on Jan. 8, 2019, U.S. Provisional Application No. 62/804,487 filed on Feb. 12, 2019, U.S. Provisional Application No. 62/840,933 filed on Apr. 30, 2019. the contents of each of which are hereby incorporated by reference herein.

BACKGROUND

Congestion control can refer to adjusting the transmission parameters of wireless transmit/receive units (WTRUs) in a wireless communications system based on the congestion level of the system. Congestion control can be used to avoid system overload and to exploit system resources efficiently.

SUMMARY

Some embodiments provide a method implemented in a wireless transmit/receive unit (WTRU). The method includes receiving a plurality of zone configurations, receiving, for each of the plurality of zone configurations, a channel busy ratio (CBR) threshold and a mapping of zone identities (IDs) to resource pools; and measuring a CBR of a resource pool with which the WTRU is currently configured. If the measured CBR meets a CBR threshold of a first zone configuration of the plurality, the WTRU is configured with the first zone configuration, with a zone ID based on the first zone configuration and a position of the WTRU, and with a resource pool based on the mapping and the configured zone ID.

In some embodiments, each of the plurality of zone configurations indicates a maximum transmit power (Pmax) value for the WTRU. In some embodiments, the WTRU receives a maximum transmit power (Pmax) value for the WTRU for each of the plurality of zone configurations. In some embodiments, if the measured CBR meets the CBR threshold of the first zone configuration, the WTRU is configured with a maximum transmit power (Pmax) value based on the first zone configuration. In some embodiments, each of the plurality of zone configurations indicates a zone size. In some embodiments, each of the plurality of zone configurations includes zone size parameters. In some embodiments, each of the plurality of zone configurations indicates a zone dimension of the zone configuration. In some embodiments, each of the plurality of zone configurations indicates a zone length (L) and a zone width (W) of the zone configuration. In some embodiments, each of the plurality of zone configurations indicates a number of zone IDs of the zone configuration. In some embodiments, each of the plurality of zone configurations indicates a number of zones in length ($N_X$) and a number of zones in width ($N_Y$) of the configured zones.

Some embodiments provide a WTRU which includes a transceiver and a processor. The transceiver is configured to receive a plurality of zone configurations. The transceiver is also configured to receive, for each of the plurality of zone configurations, a channel busy ratio (CBR) threshold and a mapping of zone identities (IDs) to resource pools. The processor is coupled to the transceiver and configured to measure a CBR of a resource pool with which the WTRU is currently configured. The processor is also configured to configure the WTRU with a first zone configuration of the plurality of zone configurations, with a zone ID based on the first zone configuration and a position of the WTRU, and with a resource pool based on the mapping and the configured zone ID, if the measured CBR meets a CBR threshold corresponding to the first zone configuration.

In some embodiments, each of the plurality of zone configurations indicates a maximum transmit power (Pmax) value for the WTRU. In some embodiments, the transceiver is also configured to receive a maximum transmit power (Pmax) value for the WTRU, for each of the plurality of zone configurations. In some embodiments, the processor is also configured to configure the WTRU with a maximum transmit power (Pmax) value based on the first zone configuration, if the measured CBR meets the CBR threshold of the first zone configuration. In some embodiments, each of the plurality of zone configurations indicates a zone size. In some embodiments, each of the plurality of zone configurations includes zone size parameters. In some embodiments, each of the plurality of zone configurations indicates a zone dimension of the zone configuration. In some embodiments, each of the plurality of zone configurations indicates a zone length (L) and a zone width (W) of the zone configuration. In some embodiments, each of the plurality of zone configurations indicates a number of zone IDs of the zone configuration. In some embodiments, each of the plurality of zone configurations indicates a number of zones in length ($N_X$) and a number of zones in width ($N_Y$) of the configured zones.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
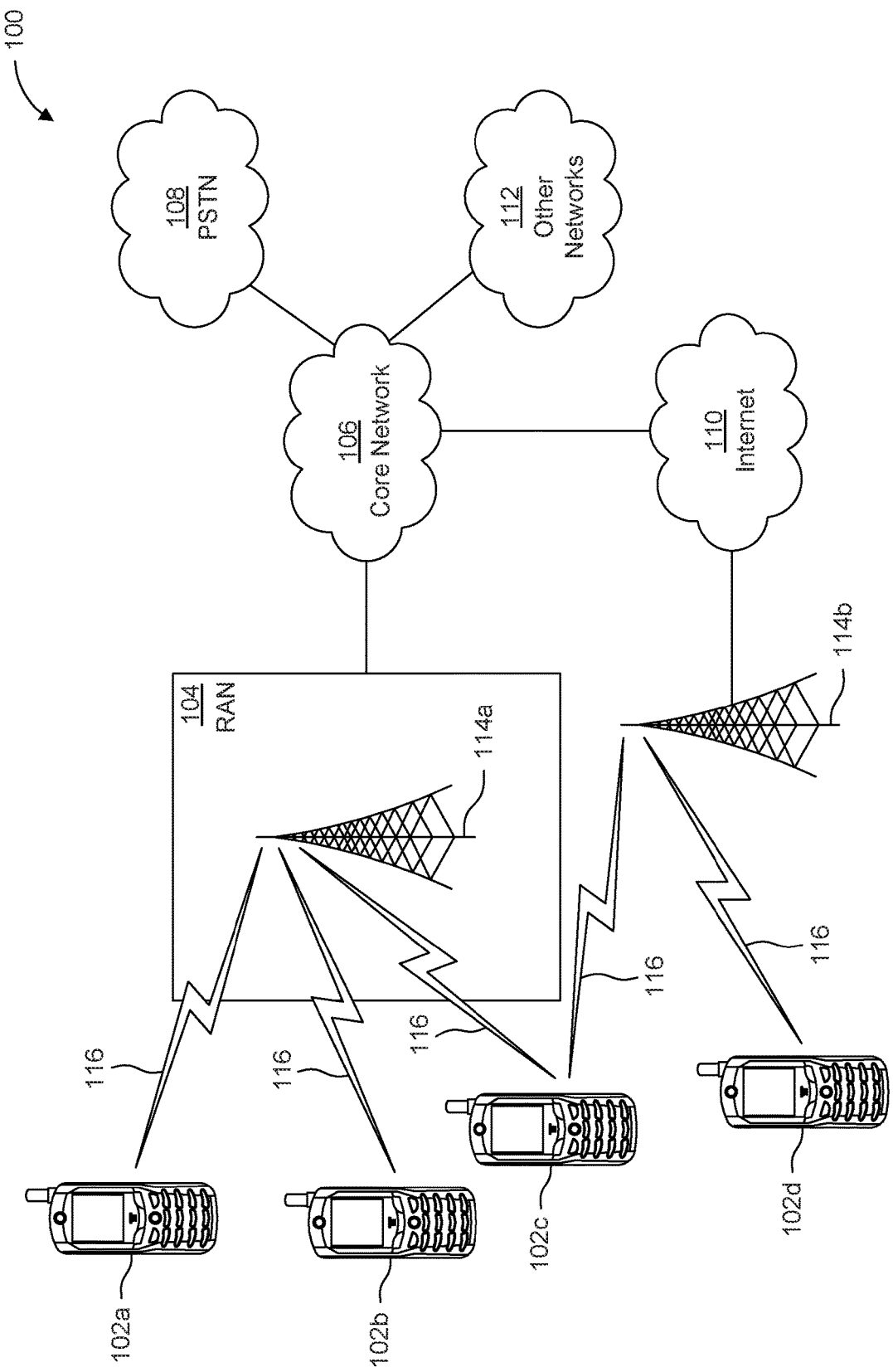
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
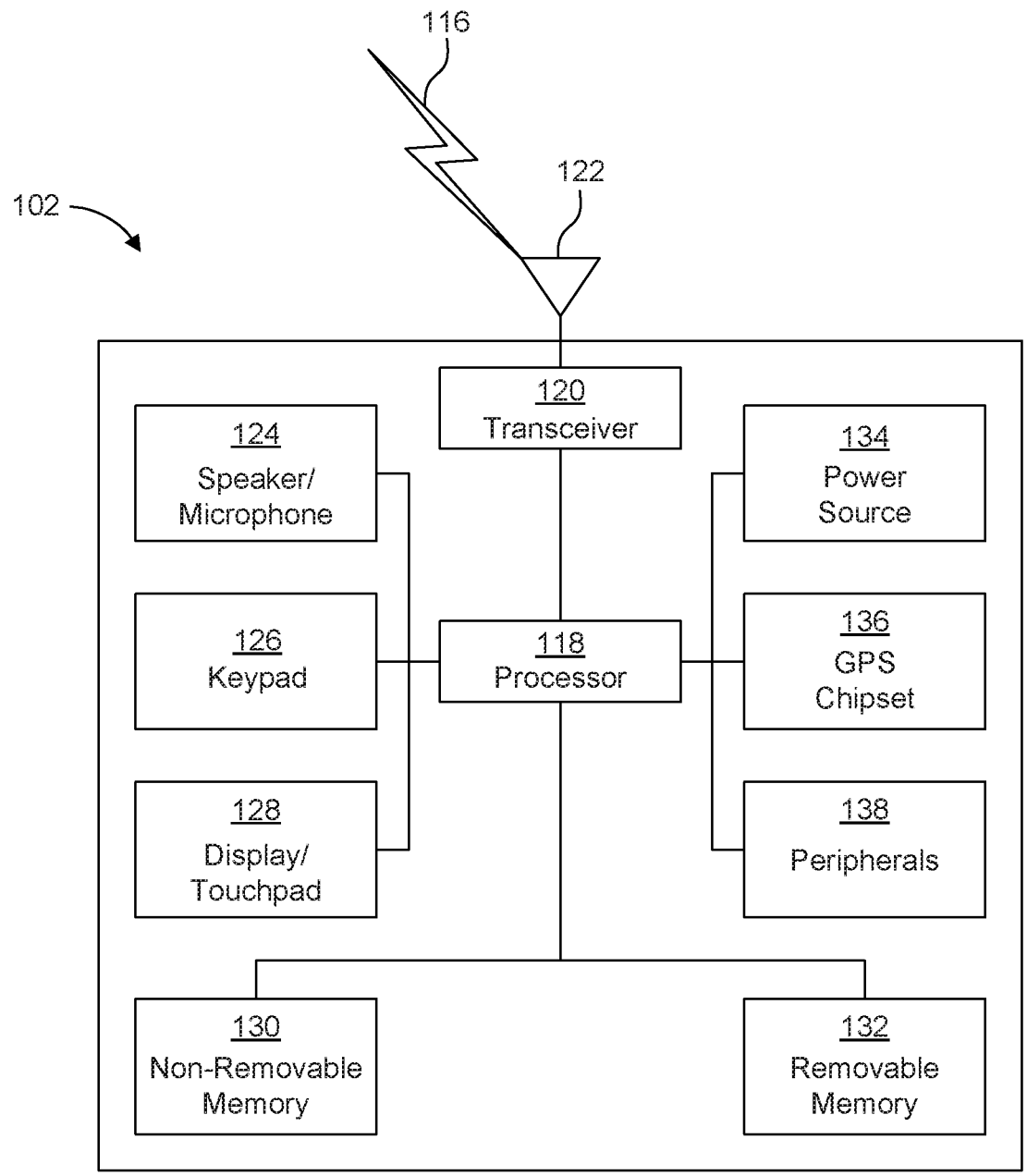
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
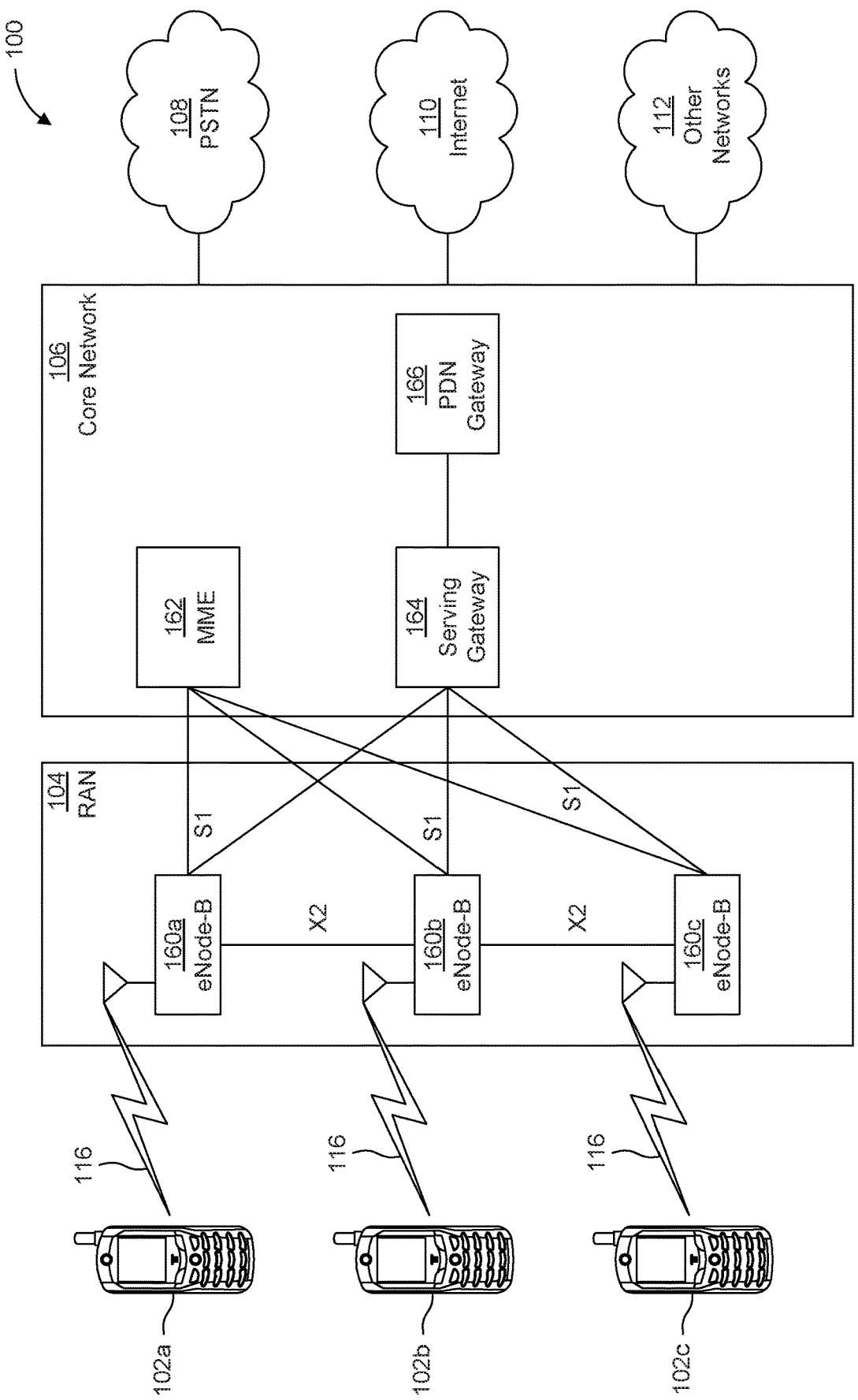
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
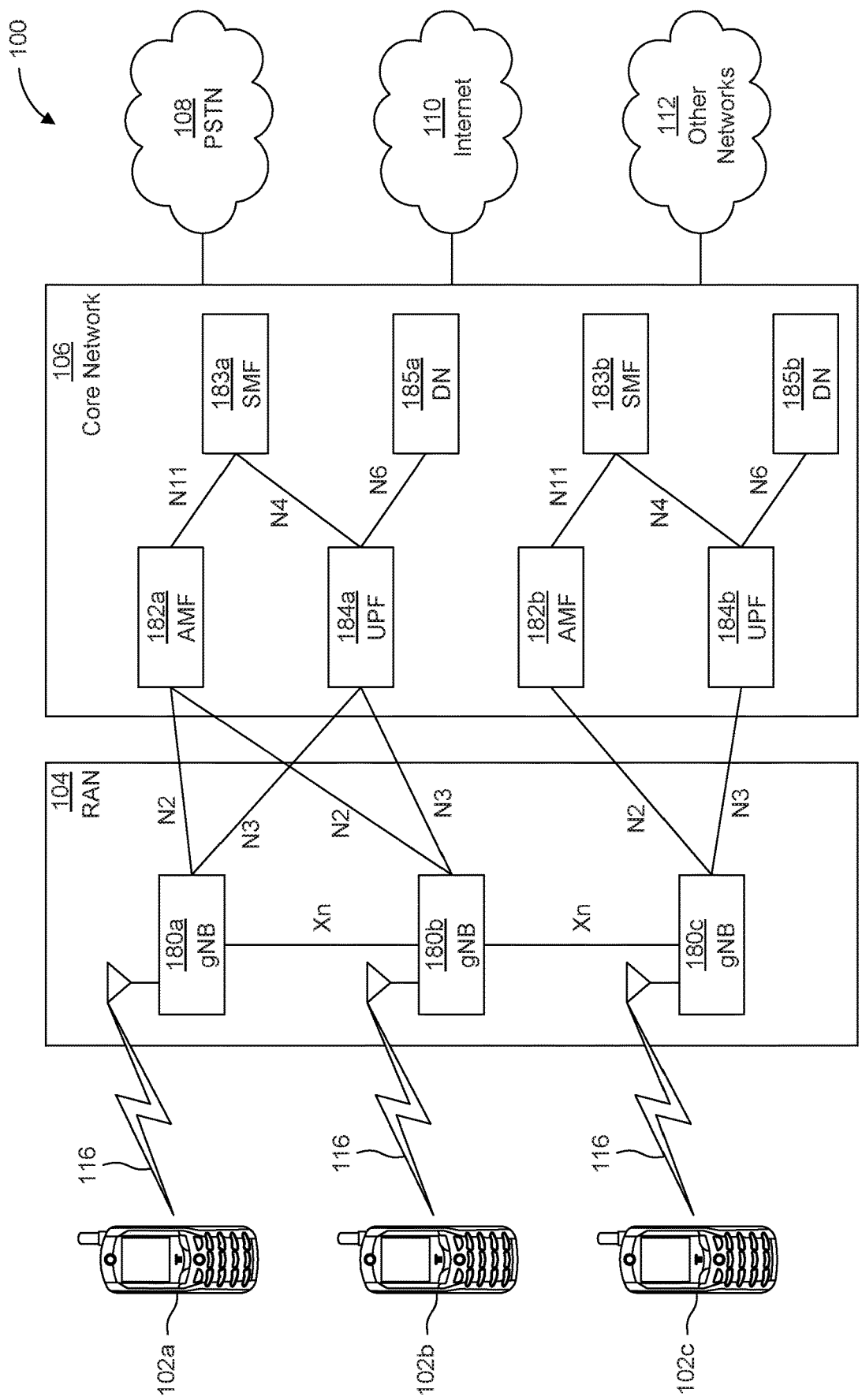
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following acronyms may be used herein:
Δf Sub-carrier spacing
5gFlex 5G Flexible Radio Access Technology
5gNB 5GFlex NodeB
ACK Acknowledgement
BLER Block Error Rate
BTI Basic TI (in integer multiple of one or more symbol duration)
CB Contention-Based (e.g. access, channel, resource)
CBR Channel Busy Ratio
CP Cyclic Prefix
CP-OFDM Conventional OFDM (relying on cyclic prefix)
CQI Channel Quality Indicator
CSI Channel State Information
CN Core Network (e.g. LTE packet core)
CR Channel Occupancy Ratio
CR_Limit Channel Occupancy Ratio Limit
CRC Cyclic Redundancy Check
CSI Channel State Information
CSG Closed Subscriber Group
D2D Device to Device transmissions (e.g. LTE Sidelink)
DCI Downlink Control Information
DL Downlink
DM-RS Demodulation Reference Signal
DRB Data Radio Bearer
EPC Evolved Packet Core
FB Feed Back
FDD Frequency Division Duplexing
FDM Frequency Division Multiplexing
FR1 Frequency Range one
FR2 Frequency Range two
ICC Industrial Control and Communications
ICIC Inter-Cell Interference Cancellation
IP Internet Protocol
LAA License Assisted Access
LBT Listen-Before-Talk
LCH Logical Channel
LCP Logical Channel Prioritization
LLC Low Latency Communications
LTE Long Term Evolution e.g. from 3GPP LTE R8 and up
MAC Medium Access Control
NACK Negative ACK
MBB Massive Broadband Communications
MC MultiCarrier
MCS Modulation and Coding Scheme
MIMO Multiple Input Multiple Output
MTC Machine-Type Communications
NAS Non-Access Stratum
OFDM Orthogonal Frequency-Division Multiplexing
OOB Out-Of-Band (emissions)
Pcmax Total available WTRU (e.g., UE) power in a given TI
PHY Physical Layer
PRACH Physical Random Access Channel
PDU Protocol Data Unit
PER Packet Error Rate
PLMN Public Land Mobile Network
PLR Packet Loss Rate
PPPP Prose Per Packet Priority
PPPR Prose Per Packet Reliability
PSS Primary Synchronization Signal
PSSSH Physical Sidelink Shared Channel
PSSCH Physical Sidelink Control Channel
QoS Quality of Service (from the physical layer perspective)
RAB Radio Access Bearer
RACH Random Access Channel (or procedure)
RGF Resource Group Format
RF Radio Front end
RNTI Radio Network Identifier
RRC Radio Resource Control
RRM Radio Resource Management
RS Reference Signal
RSCP Reference Signal Code Power
RSRP Reference Signal Received Power
RSRQ Reference Signal Received Quality
RSSI Received Signal Strength Indication
RTT Round-Trip Time
S-RSSI Sidelink-Received Signal Strength Indication
SCMA Single Carrier Multiple Access
SDU Service Data Unit
SOM Spectrum Operation Mode
SL SideLink
SS Synchronization Signal
SSS Secondary Synchronization Signal
STRB SL Time Resource Block
SWG Switching Gap (in a self-contained subframe)
TB Transport Block
TDD Time-Division Duplexing
TDM Time-Division Multiplexing
TI Time Interval (in integer multiple of one or more BTI)
TTI Transmission Time Interval (in integer multiple of one or more TI)
TRP Transmission/Reception Point
TRX Transceiver
UFMC Universal Filtered Multi-Carrier
UF-OFDM Universal Filtered OFDM
UL Uplink
URLLC Ultra-Reliable and Low Latency Communications
V2V Vehicle to vehicle communications
V2X Vehicular communications
VQI V2X 5G QoS Indicator
WLAN Wireless Local Area Networks and related technologies (IEEE 802.xx domain)

In LTE V2X, the transmission time of one transport block is one subframe. Each transport block, including PSSCH and PSCCH, occupies one or multiple sub-channel(s) if PSSCH and PSCCH are adjacent; otherwise, each PSSCH occupies one or multiple sub-channel(s). In general, each sub-channel consists of multiple contiguous physical resource blocks (PRBs) and sub-channel sizes, i.e. the number of PRB per sub-channel can be unique for each resource pool. In LTE V2X, Channel Busy Ratio (CBR) and Channel Occupancy Ratio (CR) are used as parameters to determine the channel status. CBR is used to evaluate congestion level of the system in a resource pool and CR is used to determine the channel occupancy ratio of a WTRU in one transmission pool. In a resource pool, if data and control resources (i.e., PSSCH and PSCCH) are non-adjacent, CBR and CR are evaluated in the data pool. In various examples herein, the term CBR is used to describe congestion for ease of description, but any measure of congestion can be used in various embodiments.

If CBR and CR are evaluated in subframe n, CBR is defined as the portion of sub-channels in the resource pool whose S-RSSI measured by the WTRU is greater than a configured or pre-configured value over subframes [n−100, n−1] and CR is defined as total number of sub-channels used for the its transmission in subframes [n−a, n−1] and granted in subframe [n, n+b] divided by the total number of configured sub-channels in the transmission pool over [n−a, n+b].

In LTE V2X, the congestion control mechanism is implemented at resource selection and transport block transmission periods. In the resource selection period, the WTRU can adjust the following parameters based on CBR of the resource pool and PPPP of the pending packet: maximum transmit power; a range on number of retransmissions per TB; a range of number of sub-channel used for PSSCH; and a range of MCS.

For each CBR range, the WTRU is configured or preconfigured with a list of Channel Occupancy Ratio limitation, each of which corresponds to one PPPP. When the WTRU has a configured grant and data is available for transmission, it may need to ensure that its CR does not exceed cr_limit, which is the maximum channel occupancy ratio of a WTRU corresponding to a PPPP, including dropping of transmission and/or TB.

New use cases may be defined in frequencies FR1 and FR2 (i.e., up to 52.6 GHz) for sidelink communication. A common design may be used for both FR1 and FR2. In high frequency, beam-based communication can be used to compensate for high propagation loss. Therefore, the WTRU may perform beam sweeping to cover multiple directions in the broadcast-based services.

In NR V2X, a user may be expected to support diverse types of services with different latency requirements. Therefore, a WTRU may use different transmission formats based on a latency requirement of each packet. For certain (e.g., critical) latency services, a WTRU may perform symbol-based transmission while for other (e.g., non-critical) latency services, a WTRU may perform slot-based transmission. In NR V2X, a WTRU may use beam-based transmission, and each transmission may have different granularity, e.g., symbol-based and slot-based transmission, depending on latency requirements of each packet. Accordingly, it may be desired to establish how a WTRU can determine the parameters for congestion control for transmissions with different resource granularities, and/or for beam-based transmissions.

The congestion control mechanism in LTE V2X can be used for NR V2X; however, this approach may result in excessive packet dropping. This may be because for congestion control in LTE V2X, when a WTRU performs resource selection or resource reservation, channel occupancy ratio is not considered. Therefore, if a WTRU evaluates CR before a TB transmission, it may need to drop the TB if the requirement of channel occupancy ratio is not satisfied. Moreover, if the CR of the channel is high enough, a WTRU may need to continuously drop the packet to lower the channel occupancy ratio. Accordingly, in may be desired to establish how a WTRU can perform resource selection and transmission parameter adaptation, considering congestion control, to reduce packet dropping.

Some embodiments include systems, methods, and devices for determination of parameters for congestion control. In NR V2X, it may be assumed that a WTRU may calculate CBR and CR to determine a channel status of the system. CBR may be used to evaluate the congestion level of the system, and CR may be used to assess the channel occupancy ratio of the WTRU. A resource group may be defined, for example, as a group of N resource block(s) spanning over M symbol(s), where either M or N can be one. One resource group may include M×N resource elements, where each resource element is defined as one resource block spanning over one symbol. An example resource group format (RGF) may be defined as a combination of M and N. In some examples, a WTRU determines when to calculate CBR. For example, the WTRU may calculate CBR based on one or more of the following events: the WTRU performs resource selection, has data available at its transmit buffer, and/or is configured for periodic and/or aperiodic CBR reporting.

Some embodiments include systems, methods, and devices for determining CBR. For example, in some embodiments a WTRU determines CBR based on energy sensing and/or SCI decoding. CBR may be defined as the portion of the occupied resource group (RG) over the configured resource groups. A resource group may be considered as occupied if it satisfies one, or any combination, of the following conditions: its measured or estimated S-RSSI/RSRP/RSCP is greater than a threshold; or, it is reserved by another WTRU, which may be determined by decoding one SCI. In some examples, CBR may be defined as the ratio of the occupied transmission patterns and the configured patterns. This approach may be used, e.g., to calculate CBR for a resource pool having pattern-based transmissions. In some examples, the WTRU may determine that a transmission pattern is occupied if one or any combination of the following conditions exist: the WTRU decodes a SCI reserving one or multiple patterns, and/or the WTRU determines a resource in the pattern as occupied.

In some embodiments, the WTRU determines availability for CBR calculation based on the properties of the data available for transmission. For example, in some embodiments, a WTRU may determine the availability/occupancy of resources for CBR calculation based on the properties of the data to be transmitted (e.g. QoS). In some embodiments, for example, a WTRU may determine CBR based on a measure of resource availability, e.g., as derived from sensing results. The criteria used for determination of such availability may depend on the QoS of the packet to be transmitted, and/or the packets in the WTRU's transmit buffers, e.g., at the time of CBR determination.

In some embodiments, the WTRU may be configured with multiple thresholds (e.g., RSRP, RSSI, etc.,) to determine the availability of a resource. In some embodiments, the WTRU may select a different threshold depending on the QoS of the TB. In some embodiments, the WTRU may thereafter determine CBR based on the resulting availability, determined using the different RSRP thresholds. Such approaches may be employed, e.g., if the WTRU calculates CBR in anticipation of performing resource selection.

In some embodiments, a WTRU may be configured with multiple RSRP thresholds for determination of availability in CBR calculation depending on the percentage of data available in its transmit buffers associated with different QoS levels. For example, if the WTRU has more than a certain number of bytes of data (X bytes, for convenience) in its buffers associated with a specific QoS level, the WTRU may utilize a particular threshold (threshold_x, for convenience) for determination of availability when considering SCI transmissions received by other WTRUs.

In some embodiments, a WTRU may calculate CBR in a window after the CBR calculation slot. For example, if the WTRU is triggered to calculate CBR in a slot n, the WTRU may calculate CBR by considering the availability of resources in the window [n+T1, n+T2], where T2 may be determined by the QoS of the pending TB(s) or (pre-)configured. This approach may be employed, for example, in cases where the WTRU calculates CBR during a resource allocation procedure.

In some embodiments, the WTRU may calculate the CBR based on the configured parameters. For example, the network may configure one or any combination of the following parameters via SIB or RRC for the WTRU to calculate the CBR of the resource pool: resource group format; resource availability threshold; and/or measurement window (e.g., duration of the window, time offset of the measurement window, etc.) This approach may be employed, for example, to provide the network with CBR information for a certain transmission granularity within a period, which may, e.g., help the network in scheduling the resource properly.

In some embodiments, a WTRU determines a CBR of one resource pool based on a CBR of another resource pool. For example, a WTRU may use the CBR calculated in a control resource pool to determine CBR in the data resource pool or vice versa. This approach may be employed, for example, in pattern-based resource pools, e.g., in which the congestion level of data and control resource pool may be similar. In some embodiments, a WTRU determines a CBR of a resource pool based on configured parameters. For example, the WTRU may use the configured parameters to calculate CBR. In some examples, the network may configure one or any combination of the following parameters via SIB or RRC for the WTRU to calculate the CBR of the resource pool: Resource group format; Resource availability threshold; and/or Measurement window (e.g., duration of the window, time offset of the measurement window, etc.)

In some cases, determining CBR based on configured parameters can have the advantage of allowing the network to have exact information of CBR for a certain transmission granularity within a period of time, which may facilitate scheduling of the resource by the network. CR may be defined as a total number of RGs used for its transmission and reserved RGs for future transmission divided by the total number of configured RGs in the resource pool in a certain period of time. In some examples, a WTRU may calculate one or more CBRs, each of which may be associated with one, or any combination, of the following: a beam; a group of beams; or a resource group format. In some examples, a WTRU may calculate one or more CBRs for one beam. A WTRU may associate a receive beam with a transmit beam. The measurement and calculation result, such as CBR of the receive beam, may be used to determine transmission behavior of its associated transmit beam. For one beam, a WTRU may calculate one or more CBR(s), each of which may be associated with a resource group format. A WTRU may calculate a CBR for all resource group formats.

This approach may be motivated by an example scenario where a WTRU has one or more unicast links with multiple WTRUs. Accordingly, the WTRU may calculate one or more CBRs, each of which may be associated with one unicast link. The CBR for all resource group formats may be calculated based on any one, or a combination, of the following: a (pre)-configured resource group format for CBR calculation; one of the (pre)-configured resource group formats having the lowest value of M; one of the (pre)-configured resource group formats having the lowest value of N; a resource group format with M=N=1; a resource group format where M=1 and N belongs to one of the configured resource group format; or a group format where N=1 and M belongs to one of the configured resource group formats.

In another example, a WTRU may calculate one CBR for one group of beams. A WTRU may associate one or more received beams with one or more transmit beams. CBR calculation of the received beam(s) may be used to determine transmission behavior of its associated transmit beam. For a group of beams, a WTRU may calculate one or multiple CBRs, each of which may correspond to one resource group format. A WTRU may calculate one CBR for all resource group formats.

This approach may be motivated by multicast or broadcast scenarios in which a WTRU may perform beam sweeping in multiple directions. Accordingly, for a packet broadcast in multiple directions, a WTRU may need a CBR for a group of beams involved in the sweeping procedure. A WTRU may determine a group of beams having high spatial correlation for one CBR calculation. For example, a WTRU may determine one group of beams for transmission in front of a vehicle and another group of beams for transmission behind the vehicle. The CBR calculation for this group of beams may be determined by the sensing result of one, or any combination, of multiple beams within the group.

If a WTRU has a packet for transmission, it may determine which CBR to use based on properties of the packet, which may include one, or any combination, of the following: QoS requirements of the packet such as priority, reliability, range, and packet delay budget of the packet; type of packet transmission: unicast, multiple cast, or broadcast; or an expected direction of transmission, potentially indicated to the WTRU from upper layers/application layers.

For example, if a WTRU has a unicast packet with high priority and a unicast link between two WTRUs has been established, the WTRU may use the CBR associated with the unicast beam(s) and resource group format for symbol-based transmission. In another example, if a WTRU has a broadcast packet with low priority, it may use the CBR associated with the group of beams for beam sweeping and the resource group format for slot-based transmission.

In some embodiments, a WTRU uses different thresholds for different types of slots to determine the availability of a subchannel in a slot. For example, in some implementations the WTRU may be configured to use different S-RSSI thresholds to determine the availability of a subchannel in a slot based on the type of slot used for sidelink transmission. In some implementations, the WTRU may use a different S-RSSI for slots having a PSFCH resource, slots shared with a Uu interface, and/or slots where all symbols are used for PSSCH and/or PSCCH transmissions.

In some implementations, the WTRU may be configured to use one S-RSS threshold per symbol per subchannel. In some such cases, the WTRU may determine the S-RSSI threshold for a subchannel in a slot by multiplying the threshold per symbol per subchannel with the number of symbols configured for PSSCH and/or PSCCH transmission.

In some embodiments, a WTRU calculates CBR based on different types of slots. For example, in some implementations the WTRU may calculate CBR based on the following formula:

$$CBR = \frac{\sum_i n_i \delta(S - RSSI(i) > S - RSSI_{Threshold}(i))}{\sum_i n_i}$$

where:
- i indicates each subchannel-slot index (which indicates one subchannel in one slot) of the CBR calculation window.
- $n_i$ indicates the number of symbols configured for PSSCH and/or PSCCH transmission.
- S-RSSI(i) indicates the measure S-RSSI in subchannel-slot i.
- $S\text{-}RSS_{Threshold}(i)$ indicates the threshold to determine the availability of the subchannel-slot i
- δ(I) is a delta function, which takes the value 1 if I is true and 0 if I is false.

In some embodiments, a WTRU calculates one or more CBRs each for unicast, groupcast, and/or broadcast transmissions. For example, in some implementations the WTRU may be configured to calculate different CBRs for different cast (e.g., unicast, groupcast, and/or broadcast) transmissions. In some implementations, the WTRU may use different S-RSSI thresholds and/or different sets of symbols within a slot for measurement to determine the availability of a subchannel in a slot for unicast/groupcast and broadcast. Such approaches may be implemented for scenarios in which unicast/groupcast and broadcast use different sets of symbols in a slot for PSSCH and/or PSCCH transmission. For example, for broadcast, the WTRU may monitor the whole slot to determine the S-RSSI, e.g., since broadcast transmission may use the whole slot. For unicast/groupcast, the WTRU may monitor earlier symbols in the slot, but may not monitor later symbols in the slot to determine S-RSSI, e.g., since those symbols may be used for PSFCH transmission.

Figure 2:
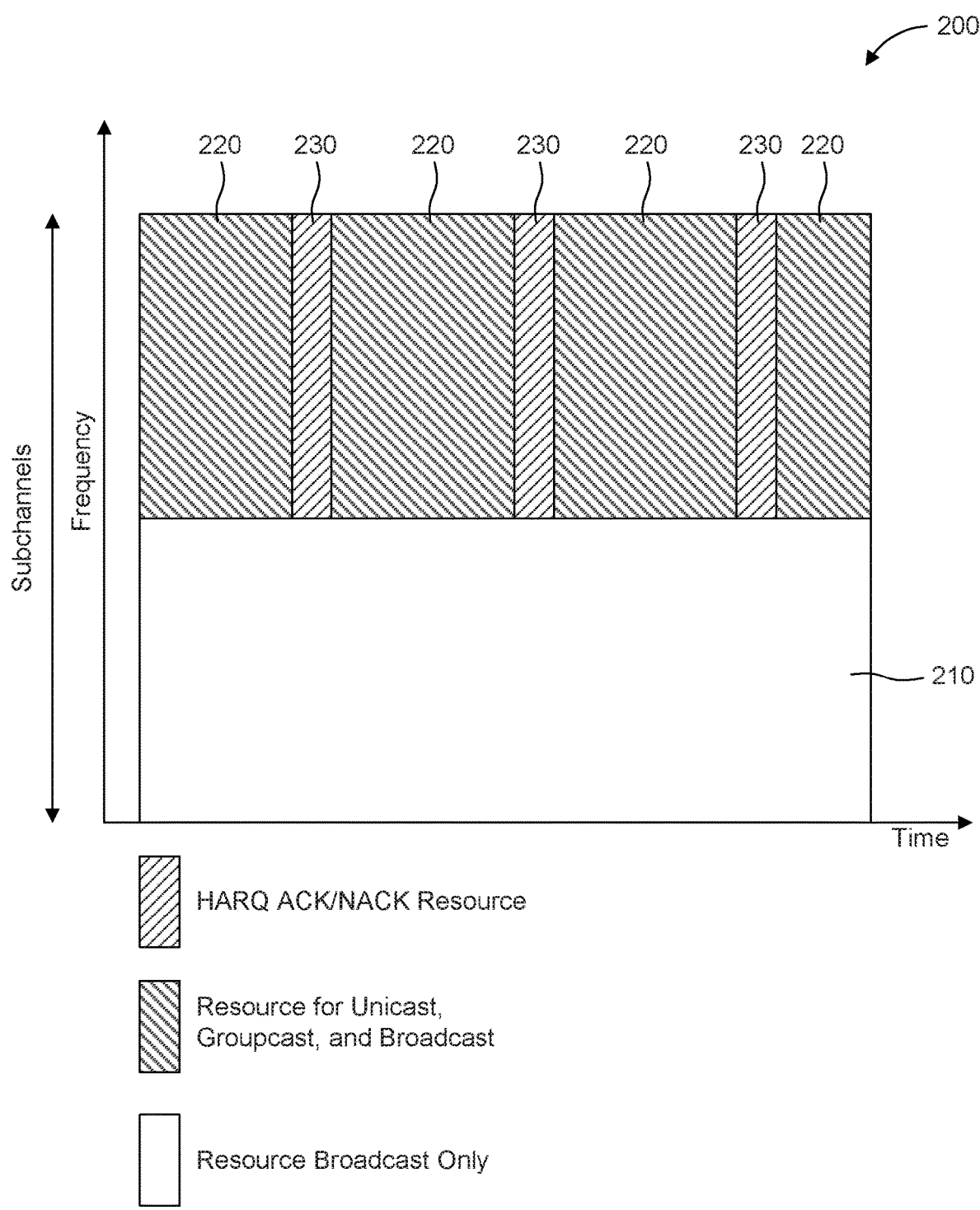
FIG. 2 is a resource pool configuration map illustrating an example resource pool configuration.

In some embodiments, a WTRU may be configured to calculate multiple CBRs for unicast, groupcast, and/or broadcast in a resource pool based on the configured resources used for each cast type. For example, FIG. 2 is a resource pool configuration map showing a resource pool configuration 200 for V2X channel resources. In this example, resources are shown in terms of sub-channel (or groups of sub-channels) on the vertical axis, and in terms of time on the horizontal axis. In configuration 200, resource pool 210 is reserved for broadcast transmissions only, resource pool 220 is reserved for unicast, groupcast, and broadcast transmission; and resources 230 are reserved for HARQ ACK/NACK. In this example, the WTRU calculates a CBR for unicast and groupcast in resources 220 since, for unicast traffic, the WTRU is allowed to use resources 220 only. Further, the WTRU calculates a CBR for broadcast in both resources 220 and resources 210 since broadcast traffic can use both resources 220 and resources 210.

In some examples, the WTRU may calculate multiple CBRs for data/control and HARQ ACK/NACK resources. This is also illustrated by FIG. 2. For example, in one resource pool, the WTRU may calculate one CBR for PSSCH and PSCCH and one CBR for HARQ ACK/NACK resources. Such approaches may be implemented for scenarios where the occupancy ratio of PSSCH/PSCCH is different from the occupancy ratio for HARQ ACK/NACK resources. Based on the CBR calculated for HARQ ACK/NACK resource, the WTRU may determine to enable or disable HARQ feedback and/or change the resource pool configuration accordingly.

In some implementations, a WTRU calculates CBR for HARQ ACK/NACK. For example, the CBR for a HARQ ACK/NACK resource, CBR_HARQ, may be calculated as the fractional of the total number of subchannel-symbol(s) allocated to PSFCH, divided by the total number of occupied subchannel-symbol(s) allocated to PSFCH. The WTRU may consider the PSFCH resource as occupied if the RSSI of the resource is greater than a threshold, and/or the WTRU detects or determines that he PSSCH and/or PSCCH resource associated with the PSFCH resource is occupied.

Some embodiments include methods, devices, and systems determination of CR and CR_limit. To determine CR, a WTRU may calculate CR of the WTRU for each priority level. A WTRU may use multiple resource group formats for transmission of packets with the same priority level. For each priority level, a WTRU may use one resource group format to calculate CR. A WTRU may use one resource group format to calculate CR for more than one priority level. For determination of CR_limit, which controls a WTRU such that it does not over-utilize the channel, a WTRU may be constrained such that the CR for packets of each priority level does not exceed a certain threshold.

Some embodiments include methods, devices, and systems for adaptation of transmission behavior and/or configuration. In some embodiments, WTRU may be configured to change the threshold, e.g., for the reliability mechanism based on CBR, to enable different forms of reliability transmission (e.g., packet duplication, retransmissions, etc.) if one or more congestion control parameters are greater than a threshold. A WTRU may be configured to perform a reliable transmission when the reliability of the packet is higher than a threshold. A WTRU may be configured to use a higher threshold to enable reliable transmissions when one or more congestion control parameters are greater than a threshold. In some embodiments, a WTRU may be configured to duplicate the packets having reliability value below a certain threshold (e.g., ≤4) when CBR or CR is sufficiently low. However, if CBR or CR is greater than a threshold, the WTRU may be configured to duplicate packets having a reliability value below a lower threshold (e.g., ≤2). The reliability value for a packet may be derived, for example, from the VQI. The WTRU may disable reliable transmissions when CBR or CR is greater than a threshold. This approach may be motivated reducing the number of packets generated when the medium is congested.

In some embodiments, a WTRU may determine to change a resource group format (RGF) transmission to satisfy the channel occupancy requirement. In this approach, the WTRU may calculate multiple values of CR and/or CBR, each of which may correspond to one RGF transmission. The WTRU may determine to change from one RGF transmission to another RGF transmission having lower CR and/or CBR. For example, in one resource pool, the WTRU may be allowed to transmit both slot-based and non-slot based transmissions. The WTRU may be semi-statically configured or preconfigured to perform slot-based transmission. If the WTRU determines that CBR and/or CR for the slot-based transmission is greater than a threshold, the WTRU may change to non-slot based transmission to satisfy the channel occupancy requirement.

In some embodiments, a WTRU may determine to change the BWP based on one or more congestion control parameters, such as CBR and CR. In some embodiments, a WTRU may be configured or preconfigured with multiple SL BWPs. Based on the value of a congestion control parameter, a WTRU may change BWP to use a BWP which is less congested.

In some embodiments, a WTRU may determine to change the resource pool based on one or more congestion control parameters, such as CBR and CR. In some embodiments, a WTRU may be configured or preconfigured with multiple resource pools. Based on the value of a congestion control parameter, a WTRU may determine to use a particular resource pool. This approach may be motivated by a need for the system to solve congestion scenarios by allocating more resources for the system. In some embodiments, a WTRU may be configured or preconfigured to change to a larger resource pool or a resource pool with more transmission time when the CBR is greater than a threshold. In some embodiments, a WTRU may be configured or preconfigured to use different resource pools for each CBR's range.

In some embodiments, a WTRU may be configured to use different zone configurations corresponding to different parameters, such as length, width, number of zones in length, and number of zones in width, $(L, W, N_X, N_Y)$. Similar to LTE, a zone may consist of a geographical area where a WTRU is allowed to use a particular resource pool. In some embodiments, the WTRU may be configured to use a maximum transmit power, based on one or more congestion control parameters. The example herein is described with respect to a rectangular zone definition in LTE; however, it is noted that this approach can be applied generally to zones of any shape (e.g., hexagonal zones, etc.). In some implementations, the number of vehicles sharing the same resource pool may be adjusted under different congestion conditions. The adjustment may be made among the following options, e.g., depending on network configuration.

In a first option, under a higher congestion scenario (e.g., with congestion above a threshold), the WTRU reduces the zone size (e.g., length and/or width). This can have the effect of increasing the spatial density of zones; i.e., such that there are more zones in a given space (e.g., $N_X$ and $N_Y$ are not changed). In a second option, under a lower congestion scenario (e.g., with congestion below a threshold, or alleviated), the WTRU increases the zone size, or returns the zone to its original size (e.g., before a reduction in size as above.) In an alternative to the first and second options, the network may configure resource pools that are used only for high congestion (e.g., with congestion above a threshold) scenarios. The resource pools may be configured such that the additional resource pools are supplemented in the zone grid to avoid repeating zones more frequently than in lower threshold (e.g., with congestion below a threshold) cases (i.e., where $N_X$ and $N_Y$ are changed).

For example, the WTRU may be configured with two different zone size configurations, such as two different configurations of $(L, W, N_X N_Y)$. In this example, the WTRU uses a first configuration if the measured CBR is below a configured threshold, and it uses a second configuration when the measured CBR is above a configured threshold. In some embodiments, the second configuration may specify each zone in the first configuration being further split into multiple zones.

Figure 3:
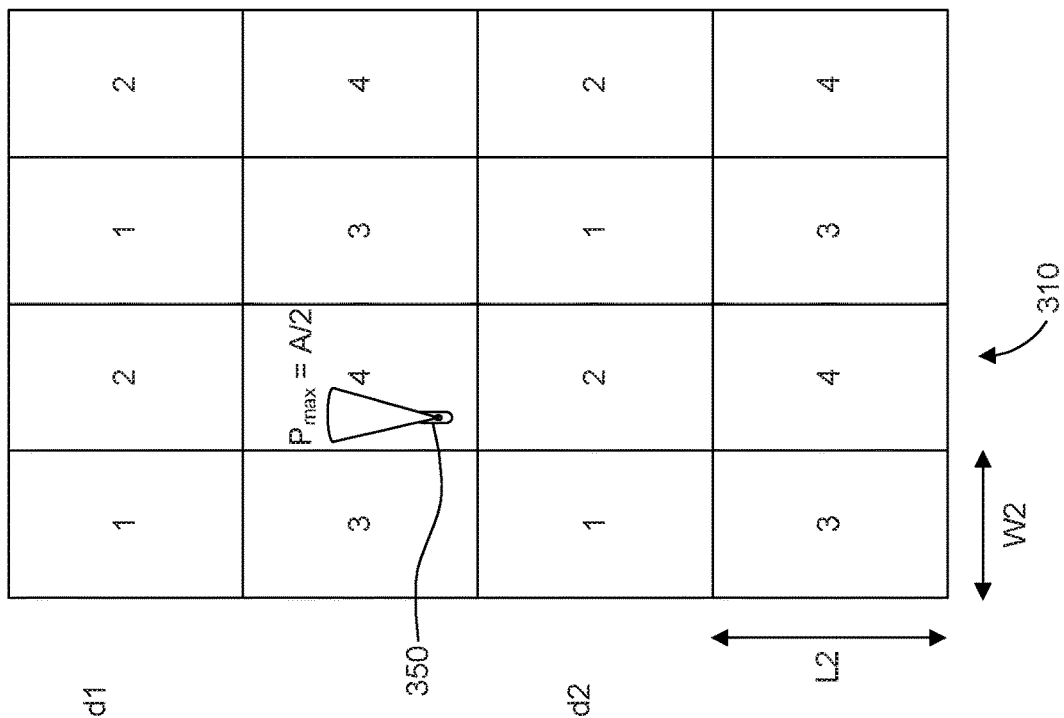
FIG. 3 is a block diagram illustrating example zone configurations.
Figure 3:
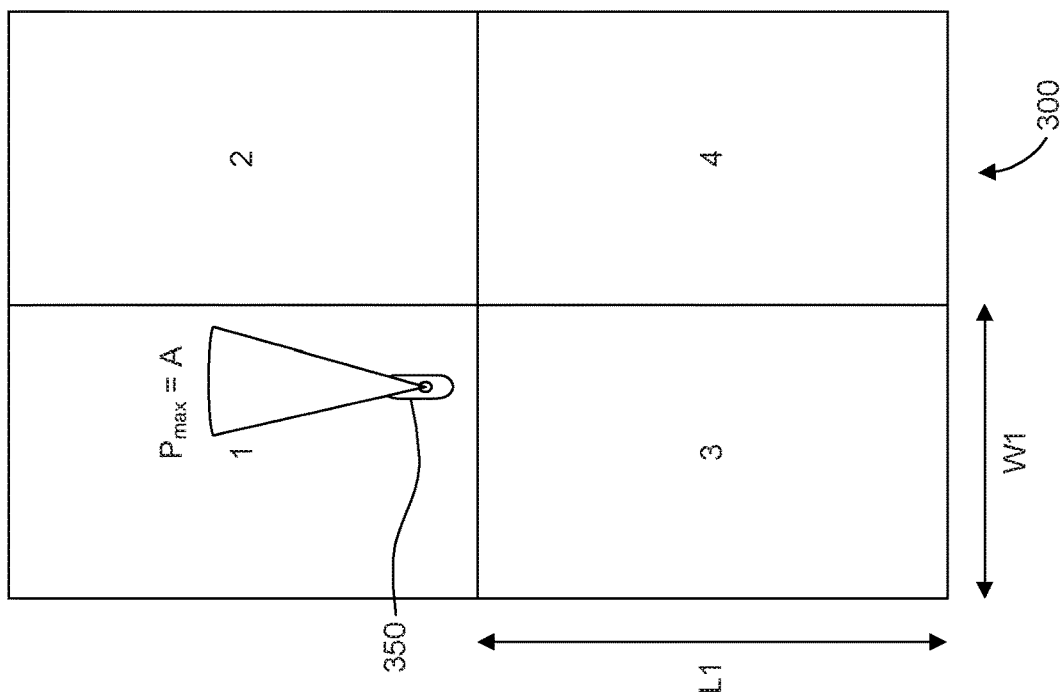

FIG. 3 is a block diagram illustrating two example zone configurations 300, 310. A WTRU 350 is configured with zone configurations 300 and 310, and CBR thresholdds CBRThreshold1, and CBRThreshold2. In this example, the zone configuration specifies a rectangular zone having zone length L, zone width W, number of zones in the X direction $N_X$, and number of zones in the Y direction, $N_Y$, and maximum transmit power of the WTRU, Pmax. In this example, zone configuration 300 has L=L1, W=W1, $N_X$=2, $N_Y$=2, and Pmax=A. Zone configuration 310 has L=L2, W=W2, $N_X$=4, $N_Y$=4, and Pmax=0.5A.

The example illustrated in FIG. 3, WTRU 350 may be configured to use zone configuration 300 when CBR is low (i.e., below CBRThreshold2 in this example). However, when CBR is greater than a certain threshold (i.e., CBRThreshold 1 in this example), the WTRU is configured to use configuration 310. In this example, in transitioning from configuration 300 to configuration 310, Pmax is reduced in proportion to the zone size reduction (e.g., as Pmax/2 in this example) to determine its zone ID and corresponding maximum transmit power.

In some embodiments, a WTRU may change its maximum power along with (e.g., at the same time as) zone configuration based on changes in the congestion metric. In some embodiments, the WTRU may configured its maximum transmit power based on CBR and PPPP (e.g., per the LTE-based approach for configuring WTRU maximum transmit power). In some embodiments, the maximum power may be changed (e.g., in addition to the change based on CBR/PPPP) by a configured or pre-configured amount if the WTRU changes from one zone size configuration to another zone size configuration. For example, if the WTRU changes from one zone size configuration to another, the WTRU may increase or decrease the maximum transmit power by a configured amount.

In some examples, the WTRU may apply such increase and/or decrease in maximum transmit power if the QoS requirements of the packet to be transmitted meet one or more configured, preconfigured, defined, or predefined conditions. An example condition may include where the WTRU does not reduce its transmit power upon a change zone size configuration if its transmission is a high priority transmission In some examples, the WTRU may apply such increase and/or decrease in maximum transmit power if the WTRU is provided with additional zones to add to the grid under conditions of zone size decrease. An example condition may include where the WTRU may change its transmit power upon a change in zone size configuration (assuming rectangular zones) if the change consists of change in L and W, but not $N_X$, and $N_Y$.

Figure 4:
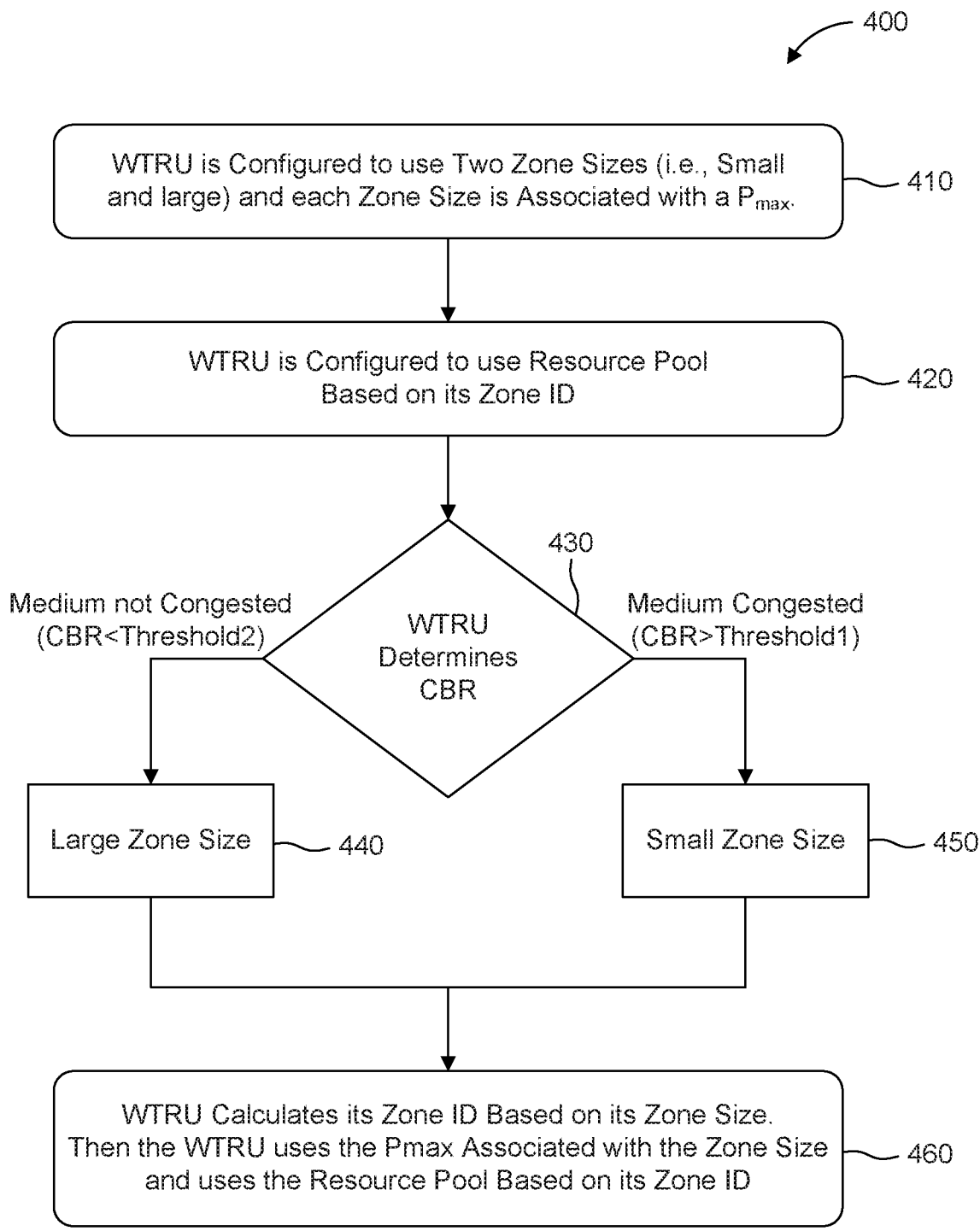
FIG. 4 is a flow chart illustrating an example method for choosing a zone configuration based on a congestion level of a transmission medium.

FIG. 4 is a flow chart illustrating an example method 400 for a WTRU to choose a zone configuration based on a congestion level of the transmission medium. In step 410, the WTRU is configured with two zone configurations. The first zone configuration corresponds to larger zone sizes (e.g., zone configuration 300 as shown and described with respect to FIG. 3), and the second zone configuration corresponds to smaller zone sizes (e.g., zone configuration 310 as shown and described with respect to FIG. 3). Each configuration (or zone size) is associated with a Pmax. In step 420, the WTRU is configured with a resource pool based on its current zone ID.

On a condition 430 that the transmission medium represented by the resource pool is not congested (e.g., a CBR threshold is greater than a given threshold (e.g., Threshold1), the WTRU configures the zone configuration corresponding to larger zone sizes in step 440. On the condition 430 that the transmission medium represented by the resource pool is congested (e.g., a CBR threshold is greater than a given threshold (e.g., Threshold2, which may be the same as or different from Threshold1), the WTRU configures the zone configuration corresponding to smaller zone sizes in step 450. In either case, the WTRU calculates a new zone ID based on its position and the selected zone size, configures a Pmax associated with the zone size, and configures a resource pool based on its zone ID and the selected zone configuration, in step 460.

Only two zone configurations are described for convenience and ease of description in the example of FIG. 4; however it is noted that any suitable number of zone configurations are possible, with corresponding selection conditions for each.

In some implementations, a WTRU may use any or combination of congestion related metrics (e.g., compared with a threshold) as a trigger to change its zone size configuration (e.g., as described above. Such metrics may include: CBR measured by the WTRU (e.g., measured similar to LTE); ratio of occupied resources measured by decoding the SCIs of other WTRU transmissions; number of received messages in a predefined/configured time; number of distinct WTRUs from which the WTRU receives messages in a predefined/configured time; and/or CBR measurements sent by another WTRU.

In some examples, the WTRU may be configured to transmit its CBR measurements periodically or if triggered by a trigger related to CBR (e.g., if its measured CBR goes above/below a threshold, or changes by a certain amount). In some examples, a WTRU may transmit its CBR in SCI transmissions with or without data; in SL synchronization signal or SL-MIB; in SL-RRC message; and/or in SL MAC CE. For example, WTRU may calculate an average (e.g., weighted average) CBR measurement as an average of its own measured CBR and CBRs received from neighbor WTRUs.

In some embodiments, a WTRU may use a zone configuration received from another WTRU to trigger its own zone size configuration change. In some embodiments, a WTRU may be configured with a set of pools to be used for each zone ID (e.g., one pool per zone ID). The set may be derived by the WTRU based on the configured zone size parameters (e.g., L, W, $N_X$, $N_Y$). In some examples, the WTRU may use the same set of pools regardless of the values of the zone size parameters it uses (e.g., derived from CBR). In some embodiments, a WTRU may be configured with two or more sets of pools and may use one set of pools when it uses a first zone size configuration (e.g., low congestion scenario, such as congestion below a threshold) and a second set of pools when it uses a second zone size configuration (e.g., a high congestion scenario, such as congestion above a threshold). The second zone may have zone parameters which are proportional to the first zone.

Some embodiments address conflicting zone configurations for neighbor WTRUs. In some cases, two UEs in range of each other may measure different CBRs and may each use a different zone configuration (e.g., one using a high CBR range configuration and another using a low CBR range configuration). In some cases, this may result in the neighboring WTRUs using the same zone ID in adjacent zones, where one WTRU transmits a reduced or lower power, and the other WTRU transmits at a higher power.

In some embodiments, to address conflicting zone configurations for neighbor WTRUs, a WTRU may change its resource selection or reselection behavior based on zone configuration state. For example, depending on the zone configuration state (e.g., specific configuration of L, W, $N_X$, $N_Y$), the WTRU may use different resource reselection criteria, different resource availability and/or occupancy criteria, a different access or sensing mechanism, or a different resource selection mechanism.

For example, to address conflicting zone configurations for neighbor WTRUs, a WTRU may be configured with a different resource selection criterion depending on the zone configuration state. For example, a WTRU may be configured with a number of consecutive periodic resources that can be reserved before performing reselection, where such number may depend on the zone configuration state. For example, a WTRU configured with smaller zone and smaller transmit power may be allowed a smaller consecutive number of periodic resources before having to perform resource selection (e.g., a smaller initial value of SL_RESOURCE_RESELECTION_COUNTER). In some cases, this can have the advantage of facilitating detection of transmissions from a WTRU having a conflicting zone configuration state which may be transmitting with higher power.

In some examples, to address conflicting zone configurations for neighbor WTRUs, a WTRU may be configured with a different criterion for determining resource availability and/or occupancy, e.g., derived from sensing results. For example, a WTRU may be configured with a threshold (e.g., RSRP, RSSI, etc.) for determining occupancy and/or availability of resources based on sensing results, where such threshold may depend on the zone configuration state. For example, a WTRU assuming a larger zone size may be configured with a lower threshold for PSSCH/PSCCH when determining occupancy of a resource during resource selection.

In some examples, to address conflicting zone configurations for neighbor WTRUs, a WTRU may change its sensing mechanism, or aspects related to its sensing algorithm. For example, the WTRU may use a different sensing mode (e.g., LBT vs sensing of SCI) depending on the zone size configuration state, assuming the WTRU can operate with multiple sensing modes; the WTRU may use different parameters related to sensing (e.g., different occupancy thresholds); and/or the WTRU may use a different sensing window for sensing results depending on the zone configuration state.

In some examples, to address conflicting zone configurations for neighbor WTRUs, a WTRU may change the resource selection mechanism based on the zone configuration state. For example, a WTRU may select a different number, type, and/or set of resources. For example, a WTRU may perform resource selection using different types of resources—e.g., the WTRU may perform pattern selection for one specific zone configuration state and perform individual resource selection for another zone configuration state, etc. In another example, the WTRU may select from a different set of resources or set of patterns, depending on the zone configuration state. In another example, the WTRU may use a different access time depending on the zone configuration state.

In some embodiments, a WTRU may change its resource selection or reselection behavior based on zone configuration state by modifying its resource selection or reselection behavior based on its zone configuration state. For example, the WTRU may modify its resource selection or reselection behavior based on the WTRU determining that a neighboring WTRU is using a different zone configuration (e.g., with higher priority. In some examples, the WTRU may make this determination based on reception of a CBR or zone configuration state of the other WTRU (e.g., as described herein); the WTRU may modify its resource selection or reselection behavior based on its velocity being higher than a specific threshold; and/or the WTRU may modify its resource selection or reselection behavior based on the QoS of the WTRU's transmissions meeting some configuration or preconfiguration condition (e.g., the WTRU may modify resource selection or reselection behavior only when it has high priority transmissions, etc.).

In some embodiments, to address conflicting zone configurations for neighbor WTRUs, the WTRU may transmit its zone size configuration on a sidelink to other WTRUs. For example, the WTRU may transmit the zone size configuration in: SCI transmissions on PSCCH (e.g., associated with an indication of data transmissions); in a MAC CE (e.g., transmitted on PSSCH); on a SL broadcast channel or a SL feedback channel (e.g., SL-MIB or PSFCH); and/or in a SL-RRC message. In some implementations, the WTRU may transmit its zone size configuration periodically. In some implementations, the WTRU may transmit its zone size configuration after the occurrence of an event, such as an event relating to a change of CBR; a change of the zone size configuration use by the WTRU or detected of another WTRU; and/or a change of location or speed of the WTRU.

In some embodiments, the WTRU may further transmit a priority along with (e.g., at the same time as) its zone size configuration. Such priority may be derived from the measured CBR. In some embodiments, the WTRU may be configured or preconfigured with a mapping of CBR range to priority, or priority may be implicit in the zone size configuration itself. For example, a zone size configuration corresponding to smaller zone sizes may have higher priority than a zone size configuration with larger zone sizes.

In some embodiments, to address conflicting zone configurations for neighbor WTRUs, the WTRU may change its zone size configuration after reception of another WTRU's zone size configuration. For example, a WTRU may change its zone size configuration to align with another WTRU's zone size configuration (such as the WTRU whose zone size it received). In some embodiments, the WTRU may align its zone size configuration with another WTRU's zone size configuration if the other WTRU is an intended recipient of the WTRU; the other WTRU is in the transmission range or transmission direction of the WTRU (e.g., based on the WTRU's own transmission direction or transmission range); a majority of received zone size configurations received from other WTRUs being different than the WTRU's own zone size configuration; and/or the other WTRU's zone size configuration being of higher priority than the WTRU's own zone size configuration (e.g., either implicitly, or based on explicit indication, as described herein).

In some embodiments, a WTRU may be configured to change the scheduling mode when one or more congestion control parameters is greater or smaller than a threshold. In some embodiments, a WTRU may determine to switch from an autonomous scheduled mode to a network scheduled mode if one or more or a combination of congestion control parameters, such as CBR/CR, are greater than a threshold. This approach may help the system to reduce the CBR of the autonomous scheduled resource pool and it may facilitate service of the WTRU by the network since the network may have better capacity in handling the congestion scenario. In such embodiments, a WTRU operating in autonomous scheduled mode may be configured to report a congestion level of the channel before and/or after requesting to change the scheduling mode. The network, based on the report CBR and its load, may determine to accept or reject the request to change the scheduling mode.

In some embodiments, a WTRU may decide to enable/disable pool sharing to perform congestion control based on the value of one or more congestion control parameters. The WTRU may be configured to change from pool sharing to non-pool sharing when CBR or CR is greater than a threshold. This approach may be motivated by a scenario where congestion control may be managed more efficiently in non-pool sharing scenario. In some embodiments, a WTRU may change its resource pattern configuration based on one or more congestion control parameters. For example, in some embodiments, e.g., associated with transmission-pattern-based resource selection, a WTRU may change pattern configuration based on congestion control parameters. In some examples, the WTRU may change one or more of the following pattern configurations: pattern window, and/or set of usage patterns.

In some embodiments, a WTRU may change the duration of the pattern window based on the congestion level of the resource pool. For example, a WTRU may be configured with a mapping between a pattern window and a congestion level of the resource pool. Afterward, based on the congestion level of the resource pool, the WTRU may select an appropriate pattern based on the mapping. This approach may be employed, e.g., to reduce the number of retransmissions for one TB resource if the resource pool is congested. This approach may be applicable, e.g., in some cases in which the WTRU may be required to transmit one TB within a pattern and the number of transmissions in one pattern is correlated with the duration of the pattern window.

In some embodiments, a WTRU changes the density of HARQ ACK/NACK feedback resources in the resource pool configuration. For example, in one approach, the WTRU may be configured to use multiple resource pool configurations, in which each configuration may include one or any combination of: the periodicity of HARQ ACK/NACK resource, the density of the HARQ ACK/NACK resource in each period (i.e., the number of HARQ ACK/NACK resources per period), and/or the resource (e.g., time and frequency resource) used for unicast, groupcast, and broadcast.

In some implementations, the WTRU may be configured to use different resource pool configurations for congestion control, e.g., based on CBR of the resource pool. For example, the WTRU may be configured to use one resource pool configuration if the CBR of the resource pool is within a predefined range. In some examples, the WTRU may be configured to use a resource pool configuration having a relatively smaller number of HARQ ACK/NACK resources and/or a relatively larger periodicity of HARQ ACK/NACK resources if the CBR of the resource pool is greater than a threshold and to use a resource pool having a relatively larger number of HARQ ACK/NACK resources and/or a relatively smaller periodicity of HARQ ACK/NACK resources if the CBR of the resource pool is smaller than a threshold. The CBR thresholds to determine which resource pool configuration to use may be (pre-)configured or configured via RRC/SIB.

In some embodiments, a WTRU modifies the size and/or density of the resource pools for unicast, groupcast, and broadcast. For example, a WTRU may be configured to use different resource pools for unicast/groupcast and broadcast. In some examples, the WTRU may be configured to reduce the size of the resource pool for unicast and/or groupcast and such resource previously used for unicast and/or groupcast may also be used for broadcast transmissions. In some examples, the WTRU may be configured to use a different configuration of the resource pool for unicast/groupcast and broadcast for a certain range of CBR. In some examples, based on the measured CBR, the WTRU may decide which resource pool configuration to use accordingly. In some implementations, for sidelink, unicast, or groupcast, a WTRU changing its resource pool configuration based on its CBR measurement may need to inform other WTRUs in the same unicast or groupcast session, e.g., so that they communicate based on the same resource pool configuration. In some examples, the WTRU can send a notification signal to the other (i.e., peer) WTRUs in the same unicast or groupcast session, which may be in the form of CBR measurement, or a direct indication of the pool configuration. A peer WTRU in the same unicast or groupcast session may be configured to change to another resource pool configuration based on information such as CBR and/or pool configuration of the peer unicast or groupcast WTRU.

Figure 5:
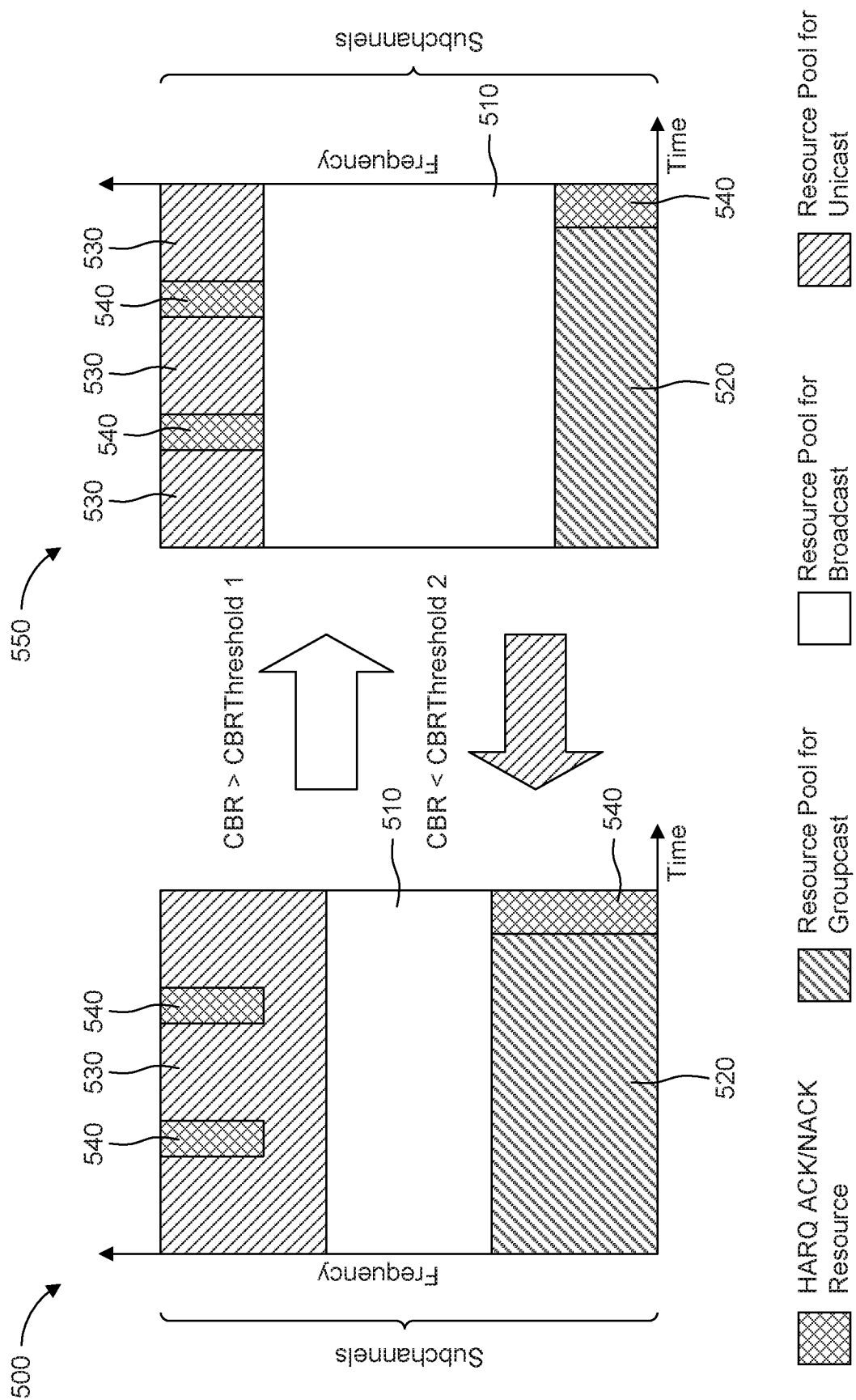
FIG. 5 is a resource pool configuration map illustrating example resource pool configurations.

FIG. 5 is a resource pool configuration map showing resource pool configurations 500 and 510 for V2X channel resources. In this example, resources are shown in terms of sub-channel (or groups of sub-channels) on the vertical axis, and in terms of time on the horizontal axis. In configurations 500 and 510, resource pool 510 is reserved for broadcast, resource pool 520 is reserved for groupcast, resource pool 530 is reserved for unicast, and resources 540 are reserved for HARQ ACK/NACK. In FIG. 5, if CBR is smaller than a threshold of the current configuration (i.e., CBR>CBRThreshold1 in this example), the WTRU uses resource pool configuration 500, in which the number of subchannels for broadcast, groupcast, and unicast, are equal. However, if CBR is greater than a threshold of the current configuration (i.e., CBR>CBRThreshold2 in this example), the WTRU uses resource pool configuration 550, in which the number of subchannels used for unicast and groupcast are reduced by half, and the number of subchannels used for broadcast is doubled. It is noted that the halving and doubling are exemplary only, and any suitable permutation can be used in other implementations.

In some embodiments, a WTRU can decide to stop unicast and/or groupcast transmission if the CBR of the resource pool is greater than a threshold. For example, the WTRU may be configured terminate one or any combination of the following transmissions if the CBR of the resource pool is greater than a threshold: one set of the unicast links, all unicast links, one set of groupcast transmissions, and/or all groupcast transmissions. Such approaches may be implemented, for example, to prioritize broadcast transmissions over unicast and groupcast transmissions.

Some embodiments include methods, devices, and systems for resource selection. In various approaches to resource selection, it may be assumed that the WTRU has data for transmission available at its buffer. The WTRU may determine a set of available resources for its transmission, which satisfies the QoS requirements of the data. The WTRU may thereafter select the resources for transmission of one or multiple TBs within the set of available resources. Some embodiments include methods, devices, and systems for dynamic resource selection. In some embodiments, a WTRU may determine a beam sweeping pattern based on CBR, CR, or both CBR and CR. A WTRU may be configured to select a maximum number of beam transmissions per packet. A WTRU may select an actual number of beam transmissions based on its CR. A WTRU may select a number of beam transmissions to satisfy CR requirements.

A WTRU may be configured with a certain number of beam sweeping configurations for transmission of one packet to cover a spatial area. Based on the current CR, the WTRU may select a particular beam sweeping configuration. Each beam sweeping configuration may indicate X beams for sweeping, each beam may be retransmitted Y times, and Y may be different for each beam.

Figure 6:
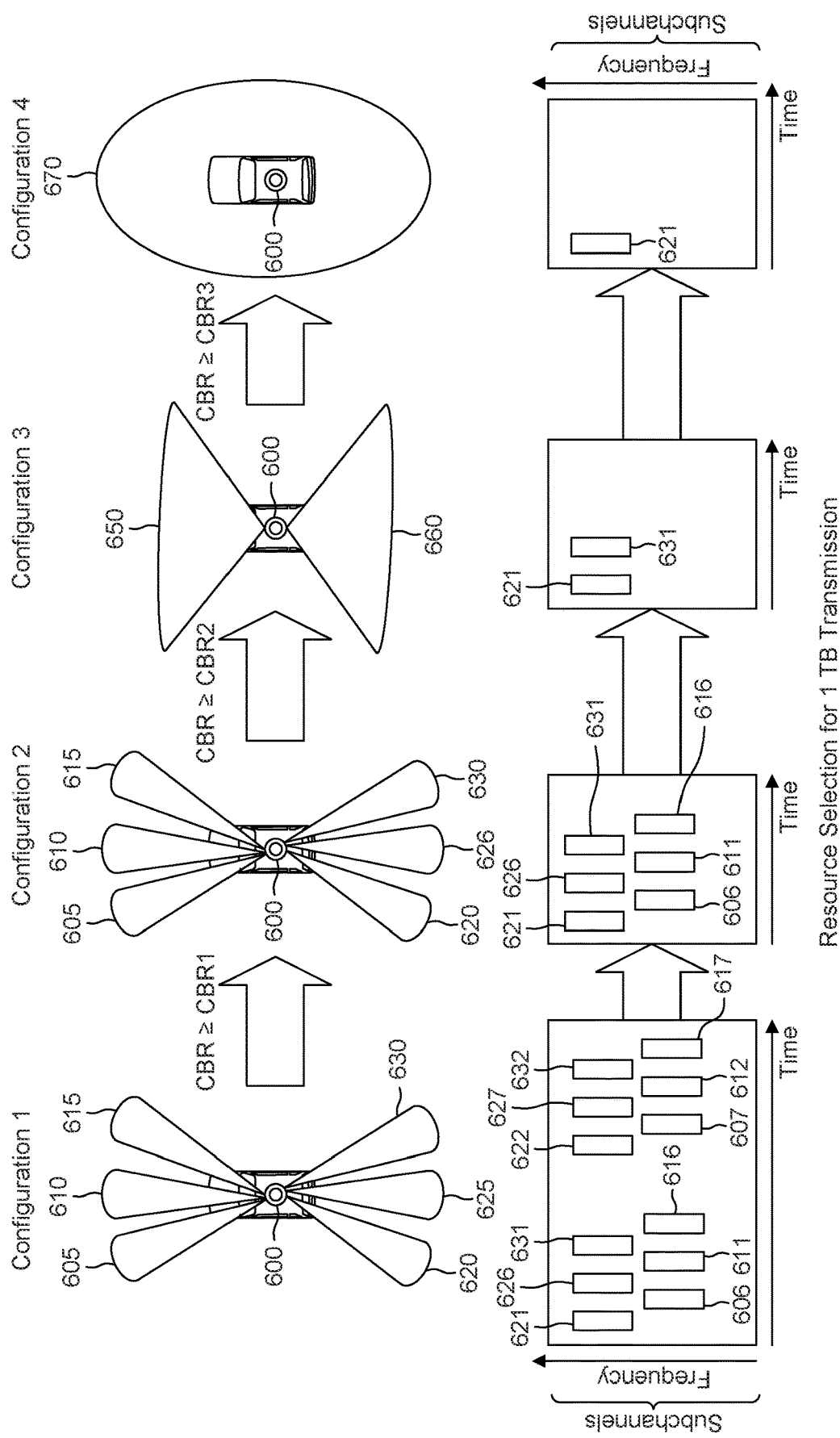
FIG. 6 is a block diagram illustrating an example of resource selection for different beam sweeping patterns.

FIG. 6 is a block diagram illustrating an example of resource selection for different beam sweeping patterns. In the example shown in FIG. 6, a WTRU 600 is configured with four beam sweeping pattern configurations (Configuration 1, Configuration 2, Configuration 3, and Configuration 4) for different value ranges of CBR.

If CBR is below a first given threshold (CBR≤CBR1 in this example), the WTRU selects transmission resources using Configuration 1, and accordingly selects 12 resources for transmission of one TB. The WTRU uses 6 antenna beams, 605, 610, 615, 620, 625, 630 to cover the entire spatial area around WTRU 600. Among the 12 selected resources, 6 resources, 606, 611, 616, 621, 626, 631 are used for transmission on antenna beams 605, 610, 615, 620, 625, 630 respectively, and resources 606, 612, 617, 622, 627, and 632 are used for retransmission on antenna beams 605, 610, 615, 620, 625, 630 respectively.

If CBR is above the first given threshold, but below a second given threshold (CBR1 ≤CBR≤CBR2 in this example), the WTRU selects transmission resources using Configuration 2, and accordingly selects resources 606, 611, 616, 621, 626, 631 (or another 6 suitable resources) for transmission of one TB on antenna beams 605, 610, 615, 620, 625, 630 respectively. No resources for retransmission are selected in Configuration 2. If the CBR is above the second given threshold, but below a third given threshold (CBR2≤CBR≤CBR3 in this example), the WTRU selects transmission resources using Configuration 3, and accordingly selects 2 resources, 621 and 631, for one TB transmission on antenna beams 650, covering the front of the WTRU, and antenna beam 660, covering the rear of the WTRU, respectively. If the CBR is above the third given threshold (CBR>CBR3 in this example), the WTRU selects one resource, 621, for one TB transmission on antenna beam 670. Antenna beam 670 is an omnidirectional beam covering the entire spatial area around WTRU 600.

In some embodiments, a WTRU selects a number of TB transmissions for a packet based on CBR, CR, or both CBR and CR. For example, a WTRU may be configured to perform resource selection for transmissions of N TBs. The WTRU may be notified from a higher layer that these TBs may originate from a packet in a higher layer. To guarantee the CR limits, the WTRU may select resources for transmission of some TBs and discard the remaining TBs. Alternatively, the WTRU may determine to discard all N TBs. The WTRU may decrease number of subchannels used for each TB transmission by increasing MCS. In some embodiments, if a property of the packet is similar to those of a video sharing packet, the receiving WTRU may be able to reconstruct the video information if some TBs are lost. In some embodiments, if a property of the packet is similar to those of a file transfer protocol (FTP) file sharing packet, the receiving WTRU may not be able to recover the information if one TB is lost. Accordingly, the selection by the WTRU to discard either all TBs or some TBs may depend on the packet's type.

Figure 7:
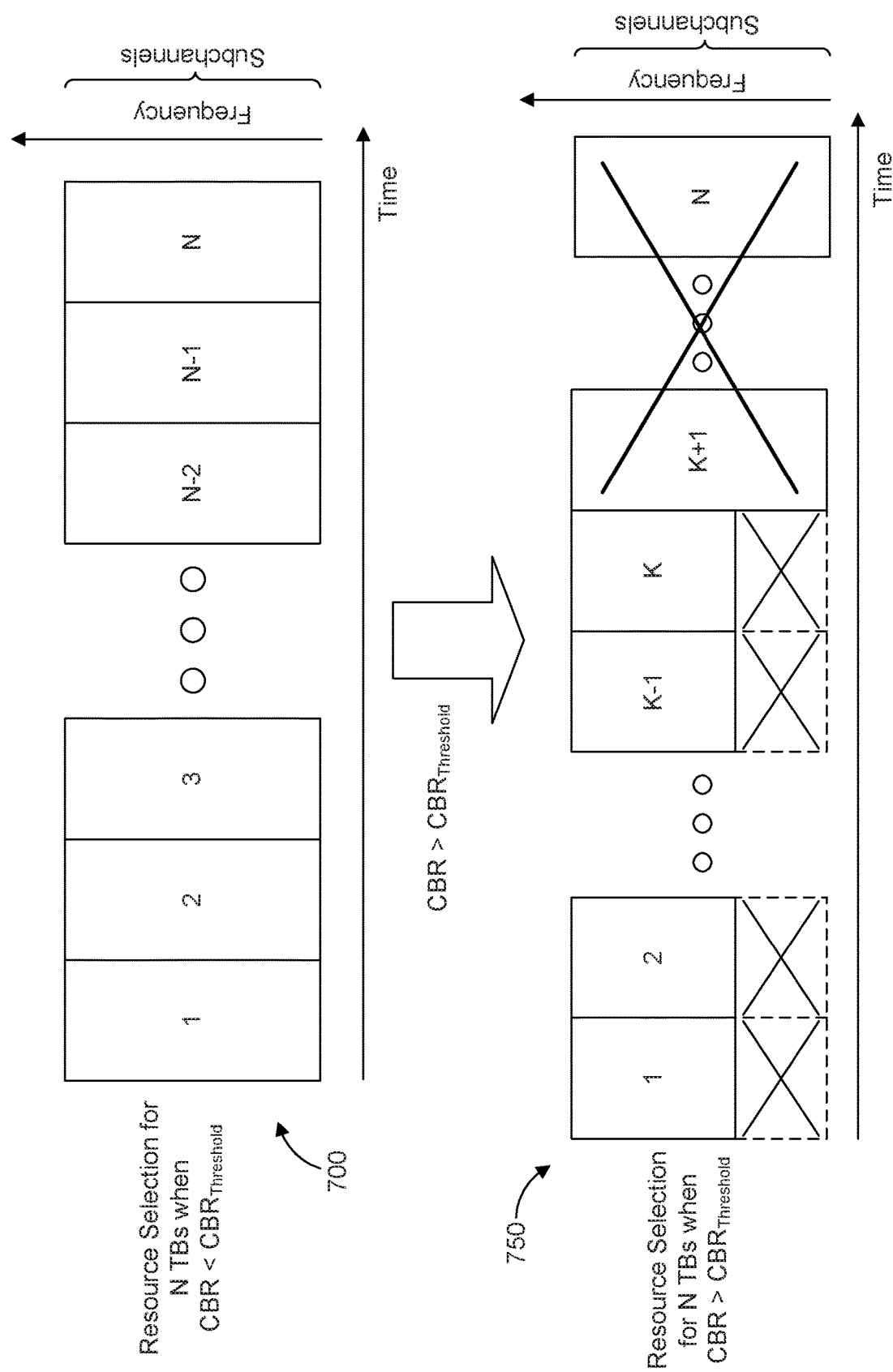
FIG. 7 resource diagram illustrating example resource selection for transmission of a packet.

FIG. 7 is a resource diagram illustrating example resource selection for transmission of a packet under two different scenarios. Here, the WTRU reduces resource size and discards transmission of some TBs for congestion control under some conditions. Resource diagram 700 illustrates a scenario where CBR is less than a given threshold (CBR<$CBR_{Threshold}$ in this example). Under this condition, the WTRU selects N resources for transmission of N TBs.

Resource diagram 750 illustrates a different scenario where CBR is greater than the given threshold (CBR>CBR$_{Threshold}$ in this example). Under this condition the WTRU selects K<N resources to transmit the packet, and also reduces the resource size of each transmission in TBs 1–K (by reducing the number of subchannels used for transmission in this example).

In some embodiments, the WTRU determines the number of sidelink processes based on CBR. In some embodiments, a WTRU may be configured to change the resource selection criteria for multiple TBs transmissions; e.g., to use a greater or fewer number of sidelink processes if transmitting a large packet which is segmented into multiple TBs. The WTRU may be configured to perform resource selection with a single sidelink process (e.g. using continuous transmission of multiple TBs) if the congestion control parameter is small. The WTRU may be configured to perform resource selection using multiple sidelink processes for each TB and these transmissions may be scattered in frequency domain and non-contiguous in time domain if the CBR is larger than a threshold.

Some embodiments include methods, devices, and systems for forward booking resource selection. In some embodiments, a WTRU determines packet dropping pattern based on traffic characteristic and/or beam transmission pattern. In some embodiments, the WTRU may determine a dropping pattern based on one or more congestion control parameters, priority and/or periodicity of the packet, and/or beam transmission pattern. In some embodiments, the WTRU applies a certain probability that it may drop a packet, e.g., based on traffic characteristics or beam transmission patterns. In some embodiments, the WTRU may deterministically drop N out of M (M≥N) packets during the resource reservation interval.

Figure 8:
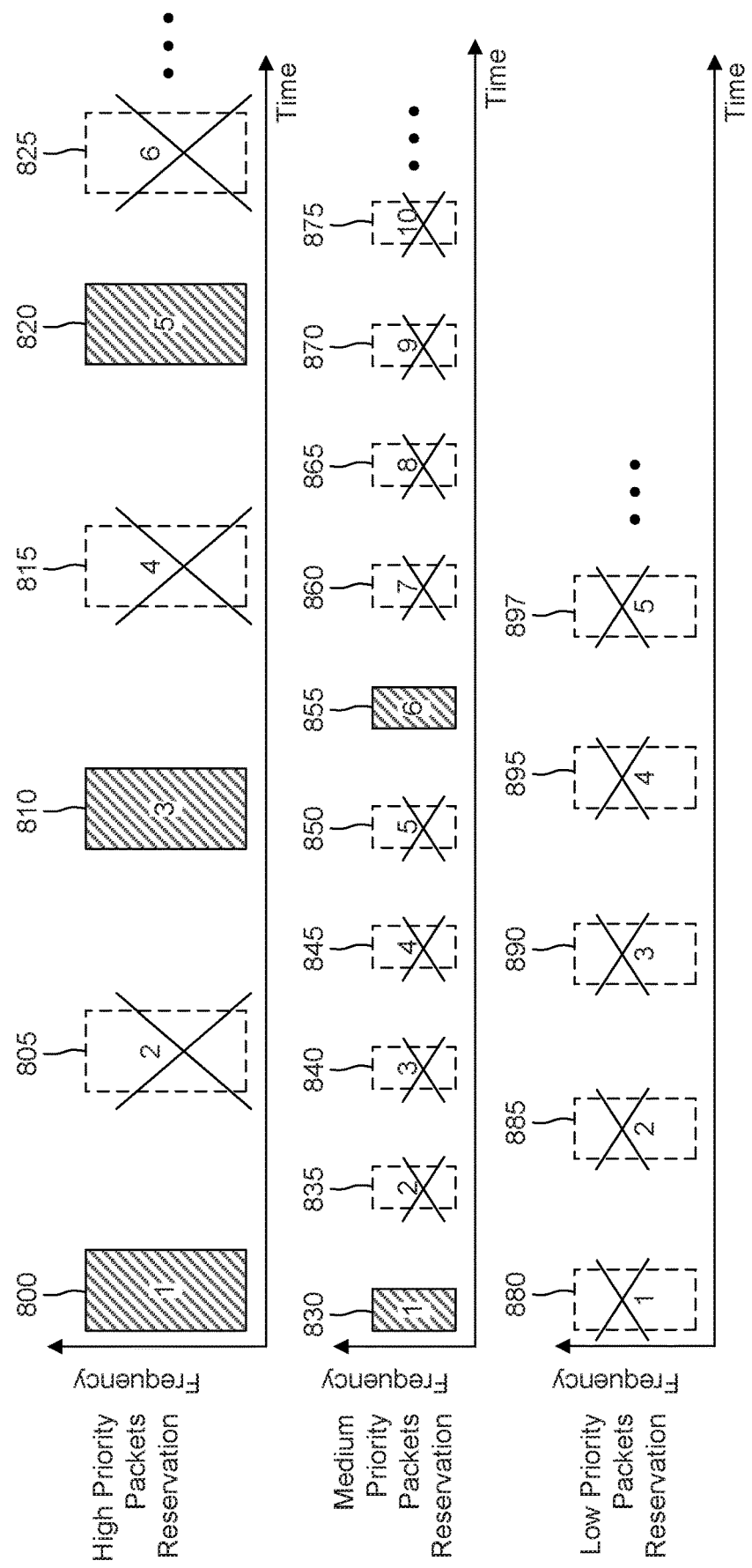
FIG. 8 is a block diagram illustrating example packet dropping patterns for different priority resource reservations.

FIG. 8 is a signal diagram illustrating packet dropping patterns for different priority resource reservations. The signal diagram illustrates a first example packet dropping pattern for high priority packets 800, 805, 810, 815, 820, 825, where one out of every two high priority packets (i.e., packets 805, 815, 825) in the resource reservation interval is dropped (i.e., deterministically). A different implementation using a probabilistic dropping rate of 60% would approximate this pattern.

The signal diagram also illustrates a second example packet dropping pattern for medium priority packets 830, 835, 840, 845, 850, 855, 860, 865, 870, 875, where four out of every five medium priority packets (i.e., packets 835, 840, 845, 850, 860, 865, 870, 875) in the resource reservation interval are dropped (i.e., deterministically). A different implementation using a probabilistic dropping rate of 80% would approximate this pattern. The signal diagram further illustrates a third example packet dropping pattern for low priority packets 880, 885, 890, 895, 897, where all of low priority packets 880, 885, 890, 895, 897 in the resource reservation interval are dropped (i.e., deterministically). A different implementation using a probabilistic dropping rate of 100% would approximate this pattern.

Figure 9:
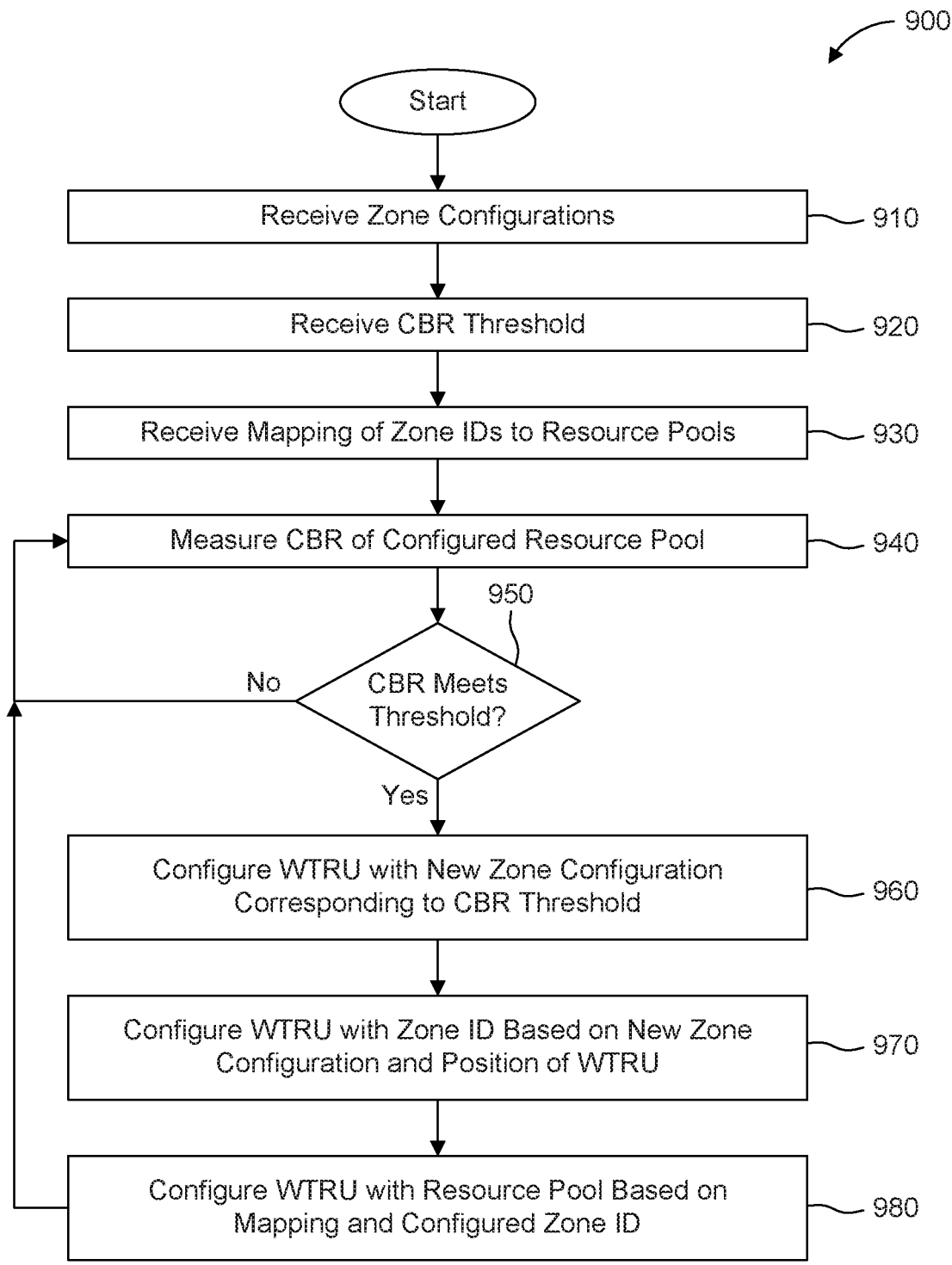
FIG. 9 is a flow chart illustrating an example method for zone configuration.

FIG. 9 is a flow chart illustrating an example method implemented in a WTRU for zone configuration. In step 910, the WTRU receives zone configurations, such as shown and described with respect to FIG. 3, as otherwise described herein, or any suitable zone configurations. In step 920, the WTRU receives a CBR threshold for each zone configuration received in step 910. In step 930, the WTRU receives a mapping of zone IDs to resource pools for each zone configuration received in step 910. Each zone of each zone configuration corresponds to a zone ID and a resource pool.

In step 940, the WTRU measures the CBR of its current resource pool to determine congestion of the transmission medium.

On condition 950 that the CBR does not meet a CBR threshold for any of the zone configurations received in step 920, the WTRU returns to step 940 and continues to measure CBR. Otherwise, on condition 950 that the CBR meets a CBR threshold for one of the zone configurations received in step 920, the WTRU configures the zone configuration corresponding to the CBR threshold in step 960, configures a zone ID based on the new zone configuration and its position in step 970, and configures a resource pool based on the mapping received in step 930 and the zone ID configured in step 970. The WTRU then returns to step 940 and continues to measure CBR.

In some embodiments, a WTRU may adjust the probability of keeping a resource based on the congestion control parameters. For example, if the CR of the WTRU is sufficiently high, the WTRU may decide not to keep the resource after reservation the window. In some embodiments, a WTRU may adjust the reservation windows based the congestion control parameters and/or the priority of the packets. For example, if the CR and/or CBR is sufficiently high, the WTRU may decide to perform dynamic resource selection for periodic traffic to guarantee the channel occupancy requirement. In some embodiments, a WTRU may first reduce the probability of keeping a resource to zero. If this adjustment is not sufficient to satisfy the channel occupancy requirement of the system, the WTRU may further reduce the reservation window for the periodic traffic.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented in a wireless transmit/receive unit (WTRU), the method comprising:
receiving information indicating a channel busy ratio (CBR) threshold; and
responsive to a CBR of a resource pool with which the WTRU is currently configured meeting the CBR threshold:
switching the WTRU from a first configuration to a second configuration, wherein the first configuration corresponds to a first zone size and a first maximum transmit power, and wherein the second configuration corresponds to a second zone size and a second maximum transmit power, and
transmitting a wireless signal at the second maximum transmit power.

2. The method of claim 1, further comprising receiving, for each of the plurality of configurations, a maximum transmit power (Pmax) value for the WTRU.

3. The method of claim 1, wherein each of the plurality of configurations includes zone size parameters.

4. The method of claim 1, wherein each of the plurality of configurations indicates a zone dimension.

5. The method of claim 1, wherein each of the plurality of configurations indicates a zone length (L) and a zone width (W).

6. The method of claim 1, wherein each of the plurality of configurations indicates a number of zone IDs.

7. The method of claim 1, wherein each of the plurality of configurations indicates a number of zones in length (NX) and a number of zones in width (NY).

8. A wireless transmit/receive unit (WTRU) comprising:
a transceiver configured to receive information indicating a channel busy ratio (CBR) threshold; and
a processor coupled to the transceiver and configured to, responsive to a CBR of a resource pool with which the WTRU is currently configured meeting the CBR threshold:
switch the WTRU from a first configuration to a second configuration, wherein the first configuration corresponds to a first zone size and a first maximum transmit power, and wherein the second configuration corresponds to a second zone size and a second maximum transmit power, and the transceiver further configured to transmit a wireless signal at the second maximum transmit power.

9. The WTRU of claim 8, wherein the transceiver is further configured to receive, for each of the plurality of configurations, a maximum transmit power (Pmax) value for the WTRU.

10. The WTRU of claim 8, wherein each of the plurality of configurations includes zone size parameters.

11. The WTRU of claim 8, wherein each of the plurality of configurations indicates a zone dimension.

12. The WTRU of claim 8, wherein each of the plurality of configurations indicates a zone length (L) and a zone width (W).

13. The WTRU of claim 8, wherein each of the plurality of configurations indicates a number of zone IDs.

14. The WTRU of claim 8, wherein each of the plurality of configurations indicates a number of zones in length (NX) and a number of zones in width (NY).

* * * * *